United States Patent
Sereshki et al.

(10) Patent No.: US 10,847,178 B2
(45) Date of Patent: Nov. 24, 2020

(54) LINEAR FILTERING FOR NOISE-SUPPRESSED SPEECH DETECTION

(71) Applicant: Sonos, Inc., Santa Barbara, CA (US)

(72) Inventors: Saeed Bagheri Sereshki, Goleta, CA (US); Daniele Giacobello, Los Angeles, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/984,073

(22) Filed: May 18, 2018

(65) Prior Publication Data

US 2019/0355384 A1 Nov. 21, 2019

(51) Int. Cl.
*G10L 25/84* (2013.01)
*G10L 21/0232* (2013.01)
*G10L 15/30* (2013.01)
*G10L 15/08* (2006.01)
(Continued)

(52) U.S. Cl.
CPC .............. *G10L 25/84* (2013.01); *G10L 15/08* (2013.01); *G10L 15/22* (2013.01); *G10L 21/0232* (2013.01); *H04R 1/406* (2013.01); *G10L 2015/088* (2013.01)

(58) Field of Classification Search
CPC ......... G10L 25/84; G10L 15/08; G10L 15/22; G10L 21/0232; G10L 2015/088; G10L 15/30; G10L 25/78; G10L 2021/02161; H04R 1/406; H04R 2201/405; H04R 2227/009; H04R 2227/001;
(Continued)

(56) References Cited

U.S. PATENT DOCUMENTS

| 4,741,038 A | 4/1988 | Elko et al. |
| 4,941,187 A | 7/1990 | Slater |
| 4,974,213 A | 11/1990 | Siwecki |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Akwasi M Sarpong
(74) *Attorney, Agent, or Firm* — McDonnell Boehnen Hulbert & Berghoff LLP

(57) ABSTRACT

Systems and methods for suppressing noise and detecting voice input in a multi-channel audio signal captured by a plurality of microphones include (i) capturing a first audio signal via a first microphone and a second audio signal via a second microphone, wherein the first and second audio signals respectively comprises first and second noise content from a noise source; (ii) identifying the first noise content in the first audio signal; (iii) using the identified first noise content to determine an estimated noise content captured by the plurality of microphones; (iv) using the estimated noise content to suppress the first and second noise content in the first and second audio signals; (v) combining the suppressed first and second audio signals into a third audio signal; and (vi) determining that the third audio signal includes a voice input comprising a wake word.

20 Claims, 10 Drawing Sheets

(51) Int. Cl.
*G10L 15/22* (2006.01)
*H04R 1/40* (2006.01)

(58) Field of Classification Search
CPC ............... H04R 2400/01; H04R 27/00; H04R 2227/005; H04R 3/005
USPC ................................................ 704/226, 278
See application file for complete search history.

(56) References Cited

U.S. PATENT DOCUMENTS

| | | | |
|---|---|---|---|
| 5,036,538 A | 7/1991 | Oken et al. |
| 5,440,644 A | 8/1995 | Farinelli et al. |
| 5,588,065 A | 12/1996 | Tanaka et al. |
| 5,740,260 A | 4/1998 | Odom |
| 5,761,320 A | 6/1998 | Farinelli et al. |
| 5,923,902 A | 7/1999 | Inagaki |
| 5,949,414 A | 9/1999 | Namikata et al. |
| 6,032,202 A | 2/2000 | Lea et al. |
| 6,088,459 A | 7/2000 | Hobelsberger |
| 6,256,554 B1 | 7/2001 | DiLorenzo |
| 6,301,603 B1 | 10/2001 | Maher et al. |
| 6,311,157 B1 | 10/2001 | Strong |
| 6,404,811 B1 | 6/2002 | Cvetko et al. |
| 6,408,078 B1 | 6/2002 | Hobelsberger |
| 6,469,633 B1 | 10/2002 | Wachter |
| 6,522,886 B1 | 2/2003 | Youngs et al. |
| 6,594,347 B1 | 7/2003 | Calder et al. |
| 6,594,630 B1 | 7/2003 | Zlokarnik et al. |
| 6,611,537 B1 | 8/2003 | Edens et al. |
| 6,611,604 B1 | 8/2003 | Irby et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,356,471 B2 | 4/2008 | Ito et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,961,892 B2 | 6/2011 | Fedigan |
| 7,987,294 B2 | 7/2011 | Bryce et al. |
| 8,014,423 B2 | 9/2011 | Thaler et al. |
| 8,032,383 B1 | 10/2011 | Bhardwaj et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,073,681 B2 | 12/2011 | Baldwin et al. |
| 8,103,009 B2 | 1/2012 | McCarty et al. |
| 8,136,040 B2 | 3/2012 | Fleming |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,284,982 B2 | 10/2012 | Bailey |
| 8,290,603 B1 | 10/2012 | Lambourne |
| 8,340,975 B1 | 12/2012 | Rosenberger |
| 8,364,481 B2 | 1/2013 | Strope et al. |
| 8,385,557 B2 | 2/2013 | Tashev et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,473,618 B2 | 6/2013 | Spear et al. |
| 8,483,853 B1 | 7/2013 | Lambourne |
| 8,484,025 B1 | 7/2013 | Moreno et al. |
| 8,738,925 B1 | 5/2014 | Park et al. |
| 8,831,761 B2 | 9/2014 | Kemp et al. |
| 8,831,957 B2 | 9/2014 | Taubman et al. |
| 8,848,879 B1 | 9/2014 | Coughlan et al. |
| 8,874,448 B1 | 10/2014 | Kauffmann et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,015,049 B2 | 4/2015 | Baldwin et al. |
| 9,042,556 B2 | 5/2015 | Kallai et al. |
| 9,060,224 B1 | 6/2015 | List |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Bedingfield, Sr. et al. |
| 9,262,612 B2 | 2/2016 | Cheyer |
| 9,275,637 B1 | 3/2016 | Salvador et al. |
| 9,288,597 B2 | 3/2016 | Carlsson et al. |
| 9,300,266 B2 | 3/2016 | Grokop |
| 9,304,736 B1 | 4/2016 | Whiteley et al. |
| 9,307,321 B1 | 4/2016 | Unruh |
| 9,318,107 B1 | 4/2016 | Sharifi |
| 9,319,816 B1 | 4/2016 | Narayanan |
| 9,324,322 B1 | 4/2016 | Torok et al. |
| 9,335,819 B1 | 5/2016 | Jaeger et al. |
| 9,361,878 B2 | 6/2016 | Boukadakis |
| 9,368,105 B1 | 6/2016 | Freed et al. |
| 9,374,634 B2 | 6/2016 | Macours |
| 9,386,154 B2 | 7/2016 | Baciu et al. |
| 9,401,058 B2 | 7/2016 | De La Fuente et al. |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,510,101 B1 | 11/2016 | Polleros |
| 9,514,476 B2 | 12/2016 | Kay et al. |
| 9,514,752 B2 | 12/2016 | Sharifi |
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | Mcdonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |

(56) References Cited

U.S. PATENT DOCUMENTS

| | | |
|---|---|---|
| 9,721,570 B1 | 8/2017 | Beal et al. |
| 9,728,188 B1 | 8/2017 | Rosen et al. |
| 9,734,822 B1 | 8/2017 | Sundaram et al. |
| 9,743,204 B1 | 8/2017 | Welch et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,769,420 B1 | 9/2017 | Moses |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1 | 5/2018 | Kelly et al. |
| 9,973,849 B1 | 5/2018 | Zhang et al. |
| 10,013,995 B1 | 7/2018 | Lashkari et al. |
| 10,026,401 B1 | 7/2018 | Mutagi et al. |
| 10,048,930 B1 | 8/2018 | Vega et al. |
| 10,049,675 B2 | 8/2018 | Haughay |
| 10,051,366 B1 | 8/2018 | Buoni et al. |
| 10,051,600 B1 | 8/2018 | Zhong et al. |
| 10,068,573 B1 | 9/2018 | Aykac et al. |
| 10,074,371 B1 | 9/2018 | Wang et al. |
| 10,079,015 B1 | 9/2018 | Lockhart et al. |
| 10,116,748 B2 | 10/2018 | Farmer et al. |
| 10,134,399 B2 | 11/2018 | Lang et al. |
| 10,136,204 B1 | 11/2018 | Poole et al. |
| 10,152,969 B2 | 12/2018 | Reilly et al. |
| 10,224,056 B1 | 3/2019 | Torok et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,346,122 B1 | 7/2019 | Morgan |
| 10,354,650 B2 | 7/2019 | Gruenstein et al. |
| 10,366,688 B2 | 7/2019 | Gunn et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 | 8/2019 | Wakisaka et al. |
| 10,445,057 B2 | 10/2019 | Vega et al. |
| 10,499,146 B2 | 12/2019 | Lang et al. |
| 10,511,904 B2 | 12/2019 | Buoni et al. |
| 10,546,583 B2 | 1/2020 | White et al. |
| 10,602,268 B1 | 3/2020 | Soto |
| 10,624,612 B2 | 4/2020 | Sumi et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0116196 A1 | 8/2002 | Tran |
| 2002/0124097 A1 | 9/2002 | Isely et al. |
| 2003/0038848 A1 | 2/2003 | Lee et al. |
| 2003/0040908 A1 | 2/2003 | Yang et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0157951 A1 | 8/2003 | Hasty |
| 2004/0024478 A1 | 2/2004 | Hans et al. |
| 2004/0093219 A1 | 5/2004 | Shin et al. |
| 2004/0127241 A1 | 7/2004 | Shostak |
| 2004/0128135 A1 | 7/2004 | Anastasakos et al. |
| 2004/0234088 A1 | 11/2004 | McCarty et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0077843 A1 | 4/2005 | Benditt |
| 2005/0164664 A1 | 7/2005 | Difonzo et al. |
| 2005/0195988 A1* | 9/2005 | Tashev .................. H04R 3/005 381/92 |
| 2005/0201254 A1 | 9/2005 | Looney et al. |
| 2005/0207584 A1 | 9/2005 | Bright |
| 2005/0268234 A1 | 12/2005 | Rossi et al. |
| 2005/0283330 A1 | 12/2005 | Laraia et al. |
| 2006/0004834 A1 | 1/2006 | Pyhalammi et al. |
| 2006/0023945 A1 | 2/2006 | King et al. |
| 2006/0104451 A1 | 5/2006 | Browning et al. |
| 2006/0147058 A1 | 7/2006 | Wang |
| 2006/0190269 A1 | 8/2006 | Tessel et al. |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2008/0037814 A1 | 2/2008 | Shau |
| 2008/0090537 A1 | 4/2008 | Sutardja |
| 2008/0146289 A1 | 6/2008 | Korneluk et al. |
| 2008/0182518 A1 | 7/2008 | Lo |
| 2008/0208594 A1 | 8/2008 | Cross et al. |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0291896 A1 | 11/2008 | Tuubel et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo |
| 2009/0018828 A1 | 1/2009 | Nakadai et al. |
| 2009/0043206 A1 | 2/2009 | Towfiq et al. |
| 2009/0052688 A1 | 2/2009 | Ishibashi et al. |
| 2009/0076821 A1 | 3/2009 | Brenner et al. |
| 2009/0153289 A1 | 6/2009 | Hope et al. |
| 2009/0197524 A1 | 8/2009 | Haff et al. |
| 2009/0220107 A1 | 9/2009 | Every et al. |
| 2009/0228919 A1 | 9/2009 | Zott et al. |
| 2009/0238377 A1 | 9/2009 | Ramakrishnan et al. |
| 2009/0248397 A1 | 10/2009 | Garcia et al. |
| 2009/0264072 A1 | 10/2009 | Dai |
| 2009/0323907 A1 | 12/2009 | Gupta et al. |
| 2009/0326949 A1 | 12/2009 | Douthitt et al. |
| 2010/0014690 A1* | 1/2010 | Wolff .................. H04R 3/005 381/92 |
| 2010/0023638 A1 | 1/2010 | Bowman |
| 2010/0035593 A1 | 2/2010 | Franco et al. |
| 2010/0070922 A1 | 3/2010 | Demaio et al. |
| 2010/0075723 A1 | 3/2010 | Min et al. |
| 2010/0088100 A1 | 4/2010 | Lindahl |
| 2010/0092004 A1 | 4/2010 | Kuze |
| 2010/0172516 A1 | 7/2010 | Lastrucci |
| 2010/0178873 A1 | 7/2010 | Lee et al. |
| 2010/0179874 A1 | 7/2010 | Higgins et al. |
| 2010/0185448 A1 | 7/2010 | Meisel |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0066634 A1 | 3/2011 | Phillips et al. |
| 2011/0091055 A1 | 4/2011 | Leblanc |

(56) References Cited

U.S. PATENT DOCUMENTS

| | | |
|---|---|---|
| 2011/0103615 A1* | 5/2011 | Sun .................. G10L 21/0208 381/94.3 |
| 2011/0145581 A1 | 6/2011 | Malhotra et al. |
| 2011/0170707 A1* | 7/2011 | Yamada ................ H04B 15/00 381/94.1 |
| 2011/0182436 A1 | 7/2011 | Murgia et al. |
| 2011/0202924 A1 | 8/2011 | Banguero et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0297284 A1 | 11/2012 | Matthews, III et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0080146 A1 | 3/2013 | Kato et al. |
| 2013/0124211 A1 | 5/2013 | McDonough |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |
| 2013/0322665 A1 | 12/2013 | Bennett et al. |
| 2013/0324031 A1 | 12/2013 | Loureiro |
| 2013/0329896 A1* | 12/2013 | Krishnaswamy .... H04R 29/005 381/58 |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1* | 1/2014 | Mohammad ........... G10K 11/16 381/306 |
| 2014/0005813 A1 | 1/2014 | Reimann |
| 2014/0006026 A1 | 1/2014 | Lamb et al. |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0195252 A1 | 7/2014 | Gruber et al. |
| 2014/0219472 A1 | 8/2014 | Huang et al. |
| 2014/0222436 A1 | 8/2014 | Binder et al. |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0259075 A1 | 9/2014 | Chang et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0310002 A1 | 10/2014 | Nitz et al. |
| 2014/0310614 A1 | 10/2014 | Jones |
| 2014/0340888 A1 | 11/2014 | Ishisone et al. |
| 2014/0357248 A1 | 12/2014 | Tonshal et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0063580 A1 | 3/2015 | Huang et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppänen et al. |
| 2015/0228803 A1 | 8/2015 | Koezuka et al. |
| 2015/0237406 A1 | 8/2015 | Ochoa |
| 2015/0245152 A1 | 8/2015 | Ding et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |

(56) References Cited

U.S. PATENT DOCUMENTS

| | | |
|---|---|---|
| 2015/0363061 A1 | 12/2015 | De, III et al. |
| 2015/0363401 A1 | 12/2015 | Chen et al. |
| 2015/0371657 A1* | 12/2015 | Gao .................. G10K 11/16 381/66 |
| 2015/0371659 A1 | 12/2015 | Gao |
| 2015/0371664 A1 | 12/2015 | Bar-Or et al. |
| 2015/0380010 A1 | 12/2015 | Srinivasan |
| 2015/0382047 A1 | 12/2015 | Van Os et al. |
| 2016/0007116 A1 | 1/2016 | Holman |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0057522 A1 | 2/2016 | Choisel et al. |
| 2016/0077710 A1 | 3/2016 | Lewis et al. |
| 2016/0088036 A1 | 3/2016 | Corbin et al. |
| 2016/0088392 A1 | 3/2016 | Huttunen et al. |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |
| 2016/0111110 A1 | 4/2016 | Gautama et al. |
| 2016/0125876 A1 | 5/2016 | Schroeter et al. |
| 2016/0127780 A1 | 5/2016 | Roberts et al. |
| 2016/0133259 A1 | 5/2016 | Rubin et al. |
| 2016/0134982 A1 | 5/2016 | Iyer |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0196499 A1 | 7/2016 | Khan et al. |
| 2016/0203331 A1 | 7/2016 | Khan et al. |
| 2016/0212538 A1 | 7/2016 | Fullam et al. |
| 2016/0216938 A1 | 7/2016 | Millington |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353218 A1 | 12/2016 | Starobin et al. |
| 2016/0357503 A1 | 12/2016 | Triplett et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0039025 A1 | 2/2017 | Kielak |
| 2017/0040018 A1 | 2/2017 | Tormey |
| 2017/0041724 A1 | 2/2017 | Master et al. |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1* | 3/2017 | Matsuo .............. G10L 21/0216 |
| 2017/0092889 A1 | 3/2017 | Seo et al. |
| 2017/0092890 A1 | 3/2017 | Seo et al. |
| 2017/0094215 A1 | 3/2017 | Western |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0134872 A1 | 5/2017 | Silva et al. |
| 2017/0139720 A1 | 5/2017 | Stein |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1* | 8/2017 | Williams .............. G06F 16/68 381/79 |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0257686 A1 | 9/2017 | Gautama et al. |
| 2017/0270919 A1* | 9/2017 | Parthasarathi .......... G10L 15/20 |
| 2017/0287485 A1 | 10/2017 | Civelli et al. |
| 2017/0332168 A1 | 11/2017 | Moghimi et al. |
| 2017/0352357 A1 | 12/2017 | Fink |
| 2017/0353789 A1* | 12/2017 | Kim .................. H04R 3/005 |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2018/0025733 A1 | 1/2018 | Qian et al. |
| 2018/0033428 A1* | 2/2018 | Kim .................. G10L 21/028 |
| 2018/0040324 A1 | 2/2018 | Wilberding |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0062871 A1 | 3/2018 | Jones et al. |
| 2018/0084367 A1 | 3/2018 | Greff et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa |
| 2018/0165055 A1 | 6/2018 | Yu et al. |
| 2018/0167981 A1 | 6/2018 | Jonna et al. |

(56) References Cited

U.S. PATENT DOCUMENTS

| | | |
|---|---|---|
| 2018/0190285 A1 | 7/2018 | Heckmann et al. |
| 2018/0199146 A1 | 7/2018 | Sheen |
| 2018/0210698 A1 | 7/2018 | Park et al. |
| 2018/0218747 A1 | 8/2018 | Moghimi et al. |
| 2018/0219976 A1 | 8/2018 | Decenzo et al. |
| 2018/0225933 A1 | 8/2018 | Park et al. |
| 2018/0228006 A1 | 8/2018 | Baker et al. |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0262793 A1 | 9/2018 | Lau et al. |
| 2018/0277107 A1 | 9/2018 | Kim |
| 2018/0277113 A1 | 9/2018 | Hartung et al. |
| 2018/0277133 A1 | 9/2018 | Deetz et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |
| 2018/0358009 A1 | 12/2018 | Daley et al. |
| 2018/0365567 A1 | 12/2018 | Kolavennu et al. |
| 2018/0367944 A1 | 12/2018 | Heo et al. |
| 2019/0013019 A1 | 1/2019 | Lawrence |
| 2019/0033446 A1 | 1/2019 | Bultan et al. |
| 2019/0043492 A1 | 2/2019 | Lang |
| 2019/0074025 A1 | 3/2019 | Lashkari et al. |
| 2019/0079724 A1 | 3/2019 | Feuz et al. |
| 2019/0081507 A1 | 3/2019 | Ide |
| 2019/0088261 A1 | 3/2019 | Lang et al. |
| 2019/0090056 A1 | 3/2019 | Rexach et al. |
| 2019/0098400 A1 | 3/2019 | Buoni et al. |
| 2019/0104119 A1 | 4/2019 | Giorgi et al. |
| 2019/0104373 A1 | 4/2019 | Wodrich et al. |
| 2019/0108839 A1 | 4/2019 | Reilly et al. |
| 2019/0130906 A1 | 5/2019 | Kobayashi et al. |
| 2019/0163153 A1 | 5/2019 | Price et al. |
| 2019/0172452 A1 | 6/2019 | Smith et al. |
| 2019/0173687 A1 | 6/2019 | MacKay et al. |
| 2019/0179607 A1 | 6/2019 | Thangarathnam et al. |
| 2019/0220246 A1 | 7/2019 | Orr et al. |
| 2019/0237067 A1 | 8/2019 | Friedman et al. |
| 2019/0295563 A1 | 9/2019 | Kamdar et al. |
| 2019/0297388 A1 | 9/2019 | Panchaksharaiah et al. |
| 2019/0304443 A1 | 10/2019 | Bhagwan |
| 2019/0311710 A1 | 10/2019 | Eraslan et al. |
| 2020/0034492 A1 | 1/2020 | Verbeke et al. |

FOREIGN PATENT DOCUMENTS

| | | |
|---|---|---|
| CN | 101310558 A | 11/2008 |
| CN | 101661753 A | 3/2010 |
| CN | 102256098 A | 11/2011 |
| CN | 103181192 A | 6/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104538030 A | 4/2015 |
| CN | 104865550 A | 8/2015 |
| CN | 105187907 A | 12/2015 |
| CN | 105284076 A | 1/2016 |
| CN | 107919123 A | 4/2018 |
| EP | 1349146 A1 | 10/2003 |
| EP | 1389853 A1 | 2/2004 |
| EP | 2683147 A1 | 1/2014 |
| EP | 2351021 B1 | 9/2017 |
| EP | 3285502 A1 | 2/2018 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005284492 A | 10/2005 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| JP | 2015161551 A | 9/2015 |
| KR | 20100111071 A | 10/2010 |
| KR | 20130050987 A | 5/2013 |
| KR | 20140035310 A | 3/2014 |
| WO | 200153994 | 7/2001 |
| WO | 2003093950 A2 | 11/2003 |
| WO | 2014159581 A1 | 10/2014 |
| WO | 2015037396 A1 | 3/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2016085775 A2 | 6/2016 |
| WO | 2016171956 A1 | 10/2016 |
| WO | 2017039632 A1 | 3/2017 |
| WO | 2017138934 A1 | 8/2017 |
| WO | 2018027142 A1 | 2/2018 |
| WO | 2018067404 A1 | 4/2018 |

OTHER PUBLICATIONS

Non-Final Office Action dated Feb. 6, 2018, issued in connection with U.S. Appl. No. 15/237,133, filed Aug. 15, 2016, 6 pages.

Non-Final Office Action dated Sep. 6, 2017, issued in connection with U.S. Appl. No. 15/131,254, filed Apr. 18, 2016, 13 pages.

Non-Final Office Action dated Apr. 9, 2018, issued in connection with U.S. Appl. No. 15/804,776, filed Nov. 6, 2017, 18 pages.

Non-Final Office Action dated May 9, 2018, issued in connection with U.S. Appl. No. 15/818,051, filed Nov. 20, 2017, 22 pages.

Notice of Allowance dated Dec. 4, 2017, issued in connection with U.S. Appl. No. 15/277,810, filed Sep. 27, 2016, 5 pages.

Notice of Allowance dated Jul. 5, 2018, issued in connection with U.S. Appl. No. 15/237,133, filed Aug. 15, 2016, 5 pages.

Notice of Allowance dated Jul. 9, 2018, issued in connection with U.S. Appl. No. 15/438,741, filed Feb. 21, 2017, 5 pages.

Notice of Allowance dated Apr. 11, 2018, issued in connection with U.S. Appl. No. 15/719,454, filed Sep. 28, 2017, 15 pages.

Notice of Allowance dated Jul. 12, 2017, issued in connection with U.S. Appl. No. 15/098,805, filed Apr. 14, 2016, 8 pages.

Notice of Allowance dated Dec. 13, 2017, issued in connection with U.S. Appl. No. 15/784,952, filed Oct. 16, 2017, 9 pages.

Notice of Allowance dated Aug. 14, 2017, issued in connection with U.S. Appl. No. 15/098,867, filed Apr. 14, 2016, 10 pages.

Notice of Allowance dated Feb. 14, 2017, issued in connection with U.S. Appl. No. 15/229,855, filed Aug. 5, 2016, 11 pages.

Notice of Allowance dated Jun. 14, 2017, issued in connection with U.S. Appl. No. 15/282,554, filed Sep. 30, 2016, 11 pages.

Notice of Allowance dated Dec. 15, 2017, issued in connection with U.S. Appl. No. 15/223,218, filed Jul. 29, 2016, 7 pages.

Notice of Allowance dated Aug. 16, 2017, issued in connection with U.S. Appl. No. 15/098,892, filed Apr. 14, 2016, 9 pages.

Notice of Allowance dated Aug. 17, 2017, issued in connection with U.S. Appl. No. 15/131,244, filed Apr. 18, 2016, 9 pages.

Notice of Allowance dated Jul. 19, 2018, issued in connection with U.S. Appl. No. 15/681,937, filed Aug. 21, 2017, 7 pages.

Notice of Allowance dated Mar. 20, 2018, issued in connection with U.S. Appl. No. 15/784,952, filed Oct. 16, 2017, 7 pages.

Notice of Allowance dated Aug. 22, 2017, issued in connection with U.S. Appl. No. 15/273,679, filed Sep. 22, 2016, 5 pages.

Notice of Allowance dated Jan. 22, 2018, issued in connection with U.S. Appl. No. 15/178,180, filed Jun. 9, 2016, 9 pages.

Notice of Allowance dated Dec. 29, 2017, issued in connection with U.S. Appl. No. 15/131,776, filed Apr. 18, 2016, 13 pages.

Notice of Allowance dated Mar. 9, 2018, issued in connection with U.S. Appl. No. 15/584,782, filed May 2, 2017, 8 pages.

(56) References Cited

OTHER PUBLICATIONS

Palm, Inc., "Handbook for the Palm VII Handheld," May 2000, 311 pages.
Presentations at WinHEC 2000, May 2000, 138 pages.
Tsiami et al. "Experiments in acoustic source localization using sparse arrays in adverse indoors environments", 2014 22nd European Signal Processing Conference, Sep. 1, 2014, 5 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Sep. 14, 2017, issued in connection with U.S. Appl. No. 15/178,180, filed Jun. 9, 2016, 16 pages.
Non-Final Office Action dated Mar. 16, 2018, issued in connection with U.S. Appl. No. 15/681,937, filed Aug. 21, 2017, 5 pages.
Non-Final Office Action dated Apr. 18, 2018, issued in connection with U.S. Appl. No. 15/811,468, filed Nov. 13, 2017, 14 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Advisory Action dated Jun. 28, 2018, issued in connection with U.S. Appl. No. 15/438,744, filed Feb. 21, 2017, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed Sep. 28, 2017, 11 pages.
International Searching Authority, International Search Report and Written Opinion dated May 23, 2017, issued in connection with International Application No. PCT/US2017/018739, filed Feb. 21, 2017, 10 pages.
International Searching Authority, International Search Report and Written Opinion dated Oct. 23, 2017, issued in connection with International Application No. PCT/US2017/042170, filed Jul. 14, 2017, 15 pages.
International Searching Authority, International Search Report and Written Opinion dated Oct. 24, 2017, issued in connection with International Application No. PCT/US2017/042227, filed Jul. 14, 2017, 16 pages.
International Searching Authority, International Search Report and Written Opinion dated May 30, 2017, issued in connection with International Application No. PCT/US2017/018728, filed Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Jun. 27, 2018, issued in connection with U.S. Appl. No. 15/438,749, filed Feb. 21, 2017, 16 pages.
Non-Final Office Action dated Jun. 30, 2017, issued in connection with U.S. Appl. No. 15/277,810, filed Sep. 27, 2016, 13 pages.
Non-Final Office Action dated Feb. 6, 2018, issued in connection with U.S. Appl. No. 15/211,689, filed Jul. 15, 2016, 32 pages.

(56) References Cited

OTHER PUBLICATIONS

Non-Final Office Action dated Feb. 19, 2020, issued in connection with U.S. Appl. No. 16/148,879, filed Oct. 1, 2018, 15 pages.
Non-Final Office Action dated Jun. 20, 2019, issued in connection with U.S. Appl. No. 15/946,585, filed Apr. 5, 2018, 10 pages.
Non-Final Office Action dated Aug. 21, 2019, issued in connection with U.S. Appl. No. 16/192,126, filed Nov. 15, 2018, 8 pages.
Non-Final Office Action dated Feb. 21, 2019, issued in connection with U.S. Appl. No. 16/214,666, filed Dec. 10, 2018, 12 pages.
Non-Final Office Action dated Jan. 21, 2020, issued in connection with U.S. Appl. No. 16/214,711, filed Dec. 10, 2018, 9 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated May 23, 2019, issued in connection with U.S. Appl. No. 16/154,071, filed Oct. 8, 2018, 36 pages.
Non-Final Office Action dated Aug. 24, 2017, issued in connection with U.S. Appl. No. 15/297,627, filed Oct. 19, 2016, 13 pages.
Non-Final Office Action dated Jul. 24, 2019, issued in connection with U.S. Appl. No. 16/439,009, filed Jun. 12, 2019, 26 pages.
Non-Final Office Action dated Dec. 26, 2018, issued in connection with U.S. Appl. No. 16/154,469, filed Oct. 8, 2018, 7 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
Non-Final Office Action dated Mar. 27, 2020, issued in connection with U.S. Appl. No. 16/790,621, filed Feb. 13, 2020, 8 pages.
Non-Final Office Action dated May 27, 2020, issued in connection with U.S. Appl. No. 16/715,713, filed Dec. 16, 2019, 14 pages.
Non-Final Office Action dated Oct. 28, 2019, issued in connection with U.S. Appl. No. 16/145,275, filed Sep. 28, 2018, 11 pages.
Non-Final Office Action dated Mar. 29, 2019, issued in connection with U.S. Appl. No. 16/102,650, filed Aug. 13, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Apr. 4, 2019, issued in connection with U.S. Appl. No. 15/718,911, filed Sep. 28, 2017, 21 pages.
Non-Final Office Action dated Jan. 4, 2019, issued in connection with U.S. Appl. No. 15/948,541, filed Apr. 9, 2018, 6 pages.
Non-Final Office Action dated Apr. 6, 2020, issued in connection with U.S. Appl. No. 16/424,825, filed May 29, 2019, 22 pages.
Non-Final Office Action dated Mar. 6, 2020, issued in connection with U.S. Appl. No. 16/141,875, filed Sep. 25, 2018, 8 pages.
Non-Final Office Action dated Sep. 6, 2018, issued in connection with U.S. Appl. No. 15/098,760, filed Apr. 14, 2016, 29 pages.
Notice of Allowance dated Dec. 2, 2019, issued in connection with U.S. Appl. No. 15/718,521, filed Sep. 28, 2017, 15 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Notice of Allowance dated Dec. 12, 2018, issued in connection with U.S. Appl. No. 15/811,468, filed Nov. 13, 2017, 9 pages.
Notice of Allowance dated Jun. 12, 2019, issued in connection with U.S. Appl. No. 15/670,361, filed Aug. 7, 2017, 7 pages.
Notice of Allowance dated Sep. 12, 2018, issued in connection with U.S. Appl. No. 15/438,744, filed Feb. 21, 2017, 15 pages.
Notice of Allowance dated Feb. 13, 2019, issued in connection with U.S. Appl. No. 15/959,907, filed Apr. 23, 2018, 10 pages.
Notice of Allowance dated Jan. 13, 2020, issued in connection with U.S. Appl. No. 16/192,126, filed Nov. 15, 2018, 6 pages.
Notice of Allowance dated Nov. 14, 2018, issued in connection with U.S. Appl. No. 15/297,627, filed Oct. 19, 2016, 5 pages.
Notice of Allowance dated Jan. 15, 2020, issued in connection with U.S. Appl. No. 16/439,009, filed Jun. 12, 2019, 9 pages.
Notice of Allowance dated Mar. 15, 2019, issued in connection with U.S. Appl. No. 15/804,776, filed Nov. 6, 2017, 9 pages.
Notice of Allowance dated Oct. 15, 2019, issued in connection with U.S. Appl. No. 16/437,437, filed Jun. 11, 2019, 9 pages.
Notice of Allowance dated Jul. 17, 2019, issued in connection with U.S. Appl. No. 15/718,911, filed Sep. 28, 2017, 5 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 18, 2019, issued in connection with U.S. Appl. No. 16/434,426, filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
Notice of Allowance dated Dec. 19, 2018, issued in connection with U.S. Appl. No. 15/818,051, filed Nov. 20, 2017, 9 pages.
Notice of Allowance dated Aug. 2, 2019, issued in connection with U.S. Appl. No. 16/102,650, filed Aug. 13, 2018, 5 pages.
Notice of Allowance dated Sep. 20, 2018, issued in connection with U.S. Appl. No. 15/946,599, filed Apr. 5, 2018, 7 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability, dated Apr. 11, 2019, issued in connection with International Application No. PCT/US2017/054063, filed on Sep. 28, 2017, 9 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/US2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Bureau, International Search Report and Written Opinion dated Nov. 18, 2019, issued in connection with International Application No. PCT/US2019052841, filed on Sep. 25, 2019, 12 pages.

(56) References Cited

OTHER PUBLICATIONS

International Bureau, International Search Report and Written Opinion dated Mar. 2, 2020, issued in connection with International Application No. PCT/US2019064907, filed on Dec. 6, 2019, 11 pages.
International Bureau, International Search Report and Written Opinion dated Dec. 20, 2019, issued in connection with International Application No. PCT/US2019052654, filed on Sep. 24, 2019, 11 pages.
International Bureau, International Search Report and Written Opinion dated Dec. 6, 2019, issued in connection with International Application No. PCT/US2019050852, filed on Sep. 12, 2019, 10 pages.
International Bureau, International Search Report and Written Opinion dated Apr. 8, 2020, issued in connection with International Application No. PCT/US2019/067576, filed on Dec. 19, 2019, 12 pages.
International Searching Authority, International Search Report and Written Opinion dated Dec. 19, 2018, in connection with International Application No. PCT/US2018/053517, 13 pages.
International Searching Authority, International Search Report and Written Opinion dated Jan. 23, 2018, issued in connection with International Application No. PCT/US2017/57220, filed on Oct. 18, 2017, 8 pages.
Japanese Patent Office, Non-Final Office Action and Translation dated Nov. 5, 2019, issued in connection with Japanese Patent Application No. 2019-517281, 6 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Jose Alvarez and Mathieu Salzmann "Compression-aware Training of Deep Networks" 31st Conference on Neural Information Processing Systems, Nov. 13, 2017, 12pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Mar. 30, 2020, issued in connection with Korean Application No. 10-2020-7004425, 5 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Maja Taseska and Emanual A.P. Habets, "MMSE-Based Blind Source Extraction in Diffuse Noise Fields Using a Complex Coherence-Based a Priori Sap Estimator" International Workshop on Acoustic Signal Enhancement 2012, Sep. 4-6, 2012, 4pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed May 20, 2019, 14 pages.
Non-Final Office Action dated Oct. 9, 2019, issued in connection with U.S. Appl. No. 15/936,177, filed Mar. 26, 2018, 16 pages.
Non-Final Office Action dated Sep. 10, 2018, issued in connection with U.S. Appl. No. 15/670,361, filed Aug. 7, 2017, 17 pages.
Non-Final Office Action dated Oct. 11, 2019, issued in connection with U.S. Appl. No. 16/177,185, filed Oct. 31, 2018, 14 pages.
Non-Final Office Action dated Feb. 12, 2019, issued in connection with U.S. Appl. No. 15/670,361, filed Aug. 7, 2017, 13 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated May 14, 2020, issued in connection with U.S. Appl. No. 15/948,541, filed Apr. 9, 2018, 8 pages.
Non-Final Office Action dated Sep. 14, 2018, issued in connection with U.S. Appl. No. 15/959,907, filed Apr. 23, 2018, 15 pages.
Non-Final Office Action dated Apr. 15, 2020, issued in connection with U.S. Appl. No. 16/138,111, filed Sep. 21, 2018, 15 pages.
Non-Final Office Action dated Jan. 15, 2019, issued in connection with U.S. Appl. No. 16/173,797, filed Oct. 29, 2018, 6 pages.
Non-Final Office Action dated Nov. 15, 2019, issued in connection with U.S. Appl. No. 16/153,530, filed Oct. 5, 2018, 17 pages.
Non-Final Office Action dated Oct. 16, 2018, issued in connection with U.S. Appl. No. 15/131,254, filed Apr. 18, 2016, 16 pages.
Non-Final Office Action dated Jan. 18, 2019, issued in connection with U.S. Appl. No. 15/721,141, filed Sep. 29, 2017, 18 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Dec. 19, 2019, issued in connection with U.S. Appl. No. 16/147,710, filed Sep. 29, 2018, 10 pages.
Advisory Action dated Apr. 24, 2020, issued in connection with U.S. Appl. No. 15/948,541, filed Apr. 9, 2018, 4 pages.
Advisory Action dated Dec. 31, 2018, issued in connection with U.S. Appl. No. 15/804,776, filed Nov. 6, 2017, 4 pages.
Anonymous,. S Voice or Google Now—The Lowdown. Apr. 28, 2015, 9 pages. [online], [retrieved on Nov. 29, 2017]. Retrieved from the Internet (URL:http://web.archive.org/web/20160807040123/http://lowdown.carphonewarehouse.com/news/s-voice-or-google-now/29958/).
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Canadian Patent Office, Canadian Office Action dated Nov. 14, 2018, issued in connection with Canadian Application No. 3015491, 3 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated Nov. 5, 2019, issued in connection with Chinese Application No. 201780072651.3, 19 pages.
Chinese Patent Office, First Office Action dated Feb. 20, 2020, issued in connection with Chinese Application No. 201780061543.6, 29 pages.

(56) References Cited

OTHER PUBLICATIONS

Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.
Chinese Patent Office, Translation of Office Action dated Jul. 18, 2019, issued in connection with Chinese Application No. 201780025029.7, 8 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Office Action dated Jan. 14, 2020, issued in connection with European Application No. 177570702, 7 pages.
European Patent Office, European Office Action dated Jan. 22, 2019, issued in connection with European Application No. 171744352, 9 pages.
European Patent Office, European Office Action dated Aug. 30, 2019, issued in connection with European Application No. 17781608.9, 6 pages.
European Patent Office, Summons to Attend Oral Proceedings mailed on Dec. 20, 2019, issued in connection with European Application No. 17174435.2, 13 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action dated Apr. 11, 2019, issued in connection with U.S. Appl. No. 15/131,254, filed Apr. 18, 2016, 17 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated May 13, 2020, issued in connection with U.S. Appl. No. 16/153,530, filed Oct. 5, 2018, 20 pages.
Final Office Action dated Oct. 15, 2018, issued in connection with U.S. Appl. No. 15/804,776, filed Nov. 6, 2017, 18 pages.
Final Office Action dated Oct. 16, 2018, issued in connection with U.S. Appl. No. 15/438,725, filed Feb. 21, 2017, 10 pages.
Final Office Action dated May 18, 2020, issued in connection with U.S. Appl. No. 16/177,185, filed Oct. 31, 2018, 16 pages.
Final Office Action dated Feb. 21, 2018, issued in connection with U.S. Appl. No. 15/297,627, filed Oct. 19, 2016, 12 pages.
Final Office Action May 21, 2020, issued in connection with U.S. Appl. No. 15/989,715, filed May 25, 2018, 21 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Final Office Action dated Feb. 5, 2019, issued in connection with U.S. Appl. No. 15/438,749, filed Feb. 21, 2017, 17 pages.
Final Office Action dated Feb. 7, 2020, issued in connection with U.S. Appl. No. 15/948,541, filed Apr. 9, 2018, 8 pages.
First Action Interview Office Action dated Aug. 14, 2019, issued in connection with U.S. Appl. No. 16/227,308, filed Dec. 20, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Helwani et al "Source-domain adaptive filtering for MIMO systems with application to acoustic echo cancellation", Acoustics Speech and Signal Processing, 2010 IEEE International Conference, Mar. 14, 2010, 4 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Oct. 21, 2019, issued in connection with U.S. Appl. No. 15/946,585, filed Apr. 5, 2018, 5 pages.
Notice of Allowance dated Apr. 24, 2019, issued in connection with U.S. Appl. No. 16/154,469, filed Oct. 8, 2018, 5 pages.
Notice of Allowance dated Apr. 27, 2020, issued in connection with U.S. Appl. No. 16/700,607, filed Dec. 2, 2019, 10 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated May 29, 2020, issued in connection with U.S. Appl. No. 16/148,879, filed Oct. 1, 2018, 6 pages.
Notice of Allowance dated Apr. 3, 2019, issued in connection with U.S. Appl. No. 16/160,107, filed Oct. 15, 2018, 7 pages.
Notice of Allowance dated Jul. 30, 2018, issued in connection with U.S. Appl. No. 15/098,718, filed Apr. 14, 2016, 5 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Nov. 30, 2018, issued in connection with U.S. Appl. No. 15/438,725, filed Feb. 21, 2017, 5 pages.
Notice of Allowance dated Oct. 30, 2019, issued in connection with U.S. Appl. No. 16/131,392, filed Sep. 14, 2018, 9 pages.
Notice of Allowance dated May 31, 2019, issued in connection with U.S. Appl. No. 15/717,621, filed Sep. 27, 2017, 9 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.

(56) References Cited

OTHER PUBLICATIONS

Notice of Allowance dated Oct. 5, 2018, issued in connection with U.S. Appl. No. 15/211,748, filed Jul. 15, 2018, 10 pages.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.
Notice of Allowance dated Apr. 7, 2020, issued in connection with U.S. Appl. No. 15/098,760, filed Apr. 14, 2016, 7 pages.
Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Notice of Allowance dated Aug. 9, 2018, issued in connection with U.S. Appl. No. 15/229,868, filed Aug. 5, 2016, 11 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Preinterview First Office Action dated Aug. 5, 2019, issued in connection with U.S. Appl. No. 16/434,426, filed Jun. 7, 2019, 4 pages.
Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
Restriction Requirement dated Aug. 14, 2019, issued in connection with U.S. Appl. No. 16/214,711, filed Dec. 10, 2018, 5 pages.
Restriction Requirement dated Aug. 9, 2018, issued in connection with U.S. Appl. No. 15/717,621, filed Sep. 27, 2017, 8 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6 pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17 pages.
Steven J. Nowlan and Geoffrey E. Hinton "Simplifying Neural Networks by Soft Weight-Sharing" Neural Computation 4, 1992, 21 pages.
Tweet "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Yamaha DME Designer 3.0 Owner's Manual; Copyright 2008, 501 pages.

\* cited by examiner

LINEAR FILTERING FOR NOISE-SUPPRESSED SPEECH DETECTION

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Network devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

The present disclosure describes systems and methods for, among other things, processing audio content captured by multiple networked microphones in order to suppress noise content from the captured audio and detect a voice input in the captured audio.

Some example embodiments involve capturing, via a plurality of microphones of a network device, (i) a first audio signal via a first microphone of the plurality of microphones and (ii) a second audio signal via a second microphone of the plurality of microphones. The first audio signal comprises first noise content from a noise source and the second audio signal comprises second noise content from the same noise source. The network device identifies the first noise content in the first audio signal and uses the identified first noise content to determine an estimated noise content captured by the plurality of microphones. Then the network device uses the estimated noise content to suppress the first noise content in the first audio signal and the second noise content in the second audio signal. The network device combines the suppressed first audio signal and the suppressed second audio signal into a third audio signal. Finally, the network device determines that the third audio signal includes a voice input comprising a wake word and, in response to the determination, transmitting at least a portion of the voice input to a remote computing device for voice processing to identify a voice utterance different from the wake word.

Some embodiments include an article of manufacture comprising tangible, non-transitory, computer-readable media storing program instructions that, upon execution by one or more processors of a network device, cause the network device to perform operations in accordance with the example embodiments disclosed herein.

Some embodiments include a network device comprising one or more processors, as well as tangible, non-transitory, computer-readable media storing program instructions that, upon execution by the one or more processors, cause the network device to perform operations in accordance with the example embodiments disclosed herein.

This summary overview is illustrative only and is not intended to be limiting. In addition to the illustrative aspects, embodiments, and features described above, further aspects, embodiments, and features will become apparent by reference to the figures and the following detailed description.

BRIEF DESCRIPTION OF THE DRAWINGS

Features, aspects, and advantages of the presently disclosed technology may be better understood with regard to the following description, appended claims, and accompanying drawings where:

Figure 1:
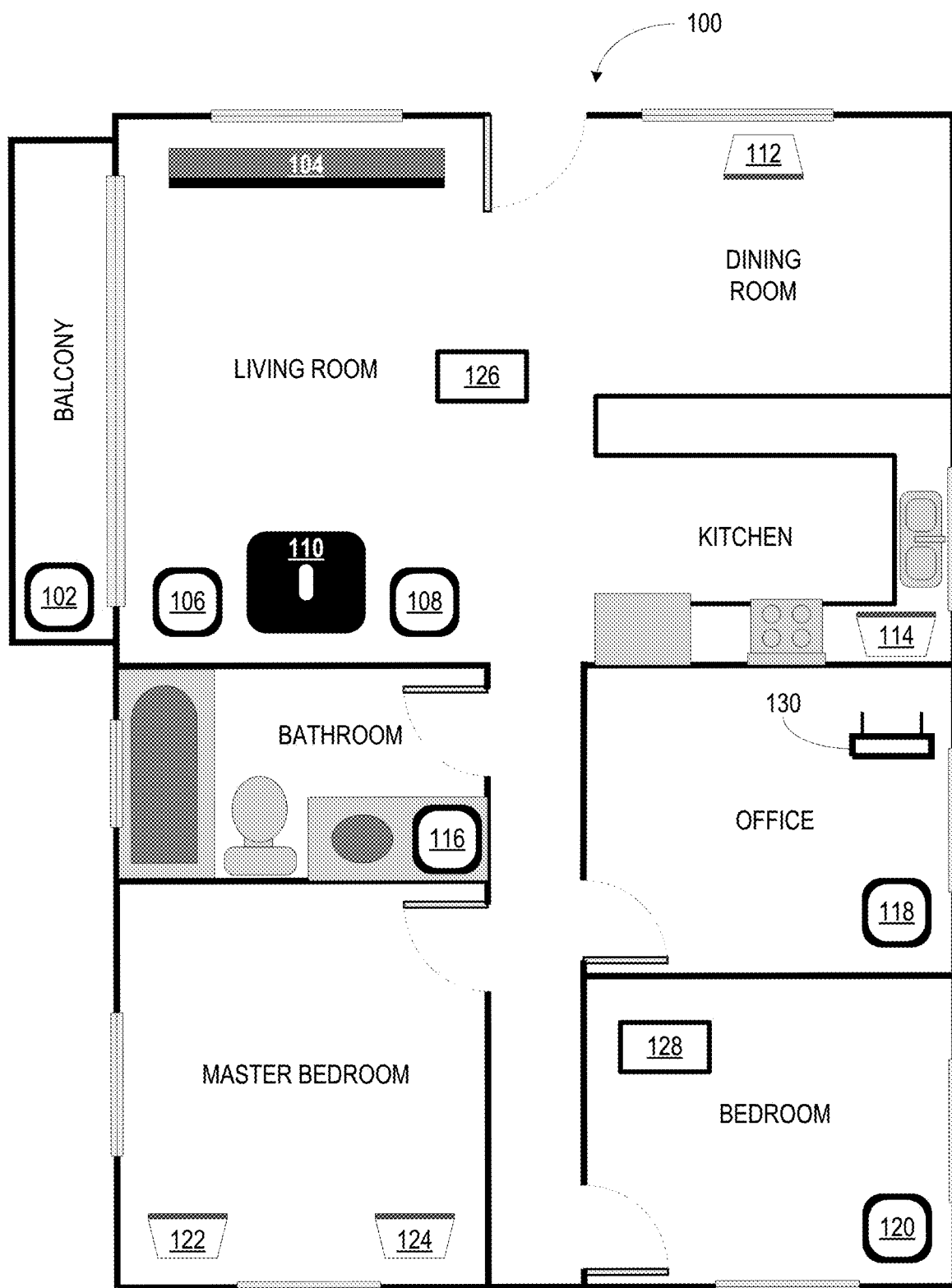
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

The present disclosure describes systems and methods for, among other things, performing noise suppression using networked microphones. In some embodiments, one or more microphones of the microphone network is a component of a network device, such as a voice-enabled device ("VED"). In operation, a VED (or other network device) equipped with a microphone listens for a "wake word" or wake phrase that prompts the VED to capture speech for voice command processing. In some embodiments, a wake phrase includes a wake word, or vice-versa.

Some examples of a "wake word" (or wake phrase) may include, "Hey Sonos" for a Sonos VED, "Alexa" for an Amazon VED, or "Siri" for an Apple VED. Other VEDs from other manufacturers may use different wake words and/or phrases. In operation, a VED equipped with a microphone listens for its wake word. And in response to detecting its wake word, the VED (individually or in combination with one or more other computing devices) records speech following the wake word, analyzes the recorded speech to determine a voice command, and then implements the voice command. Examples of typical voice commands include, "Play my Beatles playlist," "Turn on my living room lights," "Set my thermostat to 75 degrees," "add milk and bananas to my shopping list," and so on.

Figure 10:
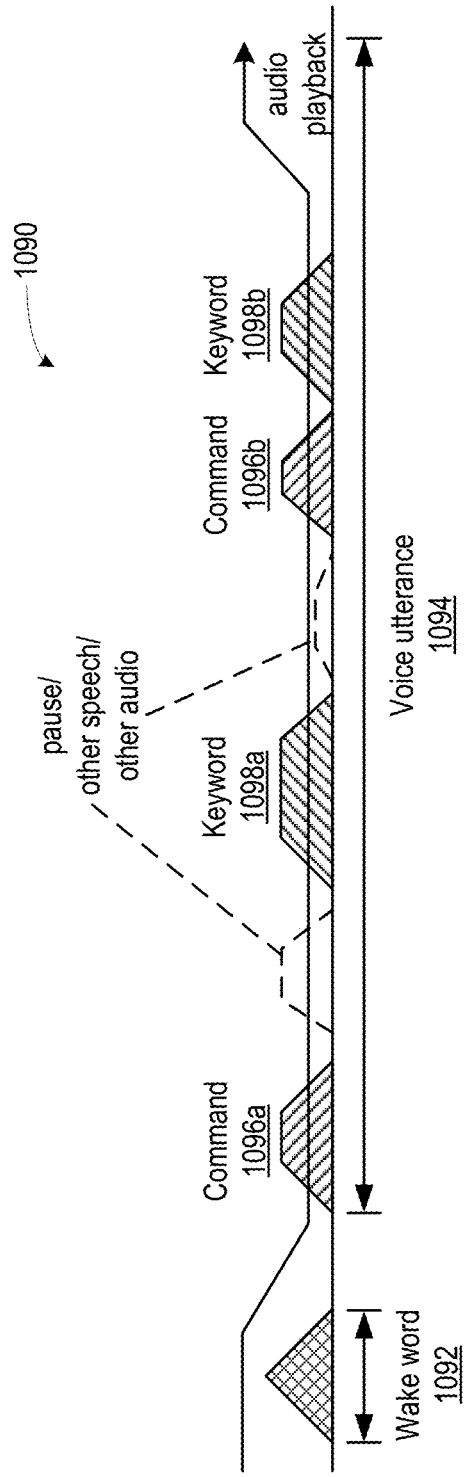
FIG. 10 shows an example voice input according to some embodiments.

FIG. 10 shows an example of a voice input 1090 that can be provided to a VED. The voice input 1090 may comprise a wake word 1092, a voice utterance 1094, or both. The voice utterance portion 1094 may include, for example, one or more spoken commands 1096 (identified individually as a first command 1096a and a second command 1096b) and one or more spoken keywords 1098 (identified individually as a first keyword 1098a and a second keyword 1098b). In one example, the first command 1096a can be a command to play music, such as a specific song, album, playlist, etc. In this example, the keywords 1098 may be one or more words identifying one or more zones in which the music is to be played, such as the Living Room and the Dining Room shown in FIG. 1. In some examples, the voice utterance portion 1094 can include other information, such as detected pauses (e.g., periods of non-speech) between words spoken by a user, as shown in FIG. 10. The pauses may demarcate the locations of separate commands, keywords, or other information spoken by the user within the voice utterance portion 1094.

As further shown in FIG. 10, the VED may direct a playback device to temporarily reduce the amplitude of (or "duck") audio content playback during capture of a wake word and/or a voice utterance 1096 comprising a command. Ducking can reduce audio interference and improve voice processing accuracy. Various examples of wake words, voice commands, and related voice input capture techniques, processing, devices, and systems, can be found, for example, in U.S. patent application Ser. No. 15/721,141, filed Sep. 27, 2017 and entitled "Media Playback System with Voice Assistance," which is incorporated herein by reference in its entirety.

One challenge with determining voice commands is obtaining a high-quality recording of the speech comprising the voice command for analysis. A higher quality recording of the speech comprising a voice command is easier for voice algorithms to analyze as compared to a lower quality recording of the speech comprising the voice command. Obtaining a high-quality recording of speech comprising a voice command can be challenging in environments where multiple people may be talking, appliances (e.g., televisions, stereos, air conditioners, dishwashers, etc.) are making noise, and other extraneous sounds are present.

One way to improve the quality of sound recordings comprising voice commands is to employ a microphone array and use beamforming to (i) amplify sound coming from the direction from where the speech containing the voice command originated relative to the microphone array and (ii) attenuate sound coming from other directions relative to the microphone array. In beamforming systems, a plurality of microphones arranged in a structured array can perform spatial localization of sounds (i.e., determine the direction from where a sound originated) relative to the microphone array. However, while effective for suppressing unwanted noise from sound recordings, beamforming has limitations. For example, because beamforming requires microphones to be arranged in a particular array configuration, beamforming is feasible only in scenarios in which it is possible to implement such an array of microphones. Some network devices may not be capable of supporting such an array of microphones due to hardware or other design constraints. As described in greater detail below, network devices and associated systems and methods configured in accordance with the various embodiments of the technology can address these and other challenges associated with conventional techniques, such as traditional beamforming, for suppressing noise content from captured audio.

The present disclosure describes using multi-microphone noise suppression techniques that do not necessarily rely on the geometrical arrangement of the microphones. Rather, techniques for suppressing noise in accordance with various embodiments involve linear time-invariant filtering of an observed noisy process, assuming known stationary signal and noise spectra, and additive noise. In some embodiments, present techniques use first audio content captured by one or more respective microphones within a network of microphones to estimate noise in second audio content that is concurrently being captured by one or more other respective microphones of the microphone network. The estimated noise from the first audio content can then be used to filter out noise and preserve speech in the second audio content.

In various embodiments, present techniques may involve aspects of Wiener filtering. Traditional Wiener filtering techniques have been used in image filtering and noise cancelling, but often comprise fidelity of the resultant filtered signal. The inventors have recognized, however, that Wiener-filtering-based and related techniques can be applied to voice input detection (e.g., wake word detection) in a way that enhances voice detection accuracy compared to voice input detection using traditional beam forming techniques.

In some embodiments, a microphone network implementing multi-microphone noise suppression techniques of the various embodiments is a component of a network device. A network device is any computing device comprising (i) one or more processors, (ii) one or more network interfaces and/or one or more other types of communication interfaces, and (iii) tangible, non-transitory computer-readable media comprising instructions encoded therein, where the instructions, when executed at least in part by the one or more processors, cause the network device to perform the functions disclosed and described herein. A network device is generic class of devices that includes, but is not limited to voice enabled devices (VEDs), networked microphone devices (NMDs), audio playback devices (PBDs), and video playback devices (VPDs). VEDs are a class of devices that includes but is not limited to NMDs, PBDs, and VPDs. For example, one type of VED is an NMD, which is a network device comprising one or more processors, a network interface, and one or more microphones. Some NMDs may additionally include one or more speakers and perform media playback functions. Another type of VED is a PBD, which is a network device comprising one or more processors, a network interface, and one or more speakers. Some PBDs may optionally include one or more microphones and perform the functions of an NMD. Yet another type of VED is a VPD, which is a network device comprising one or more processors, a network interface, one or more speakers, and at least one video display. Some VPDs may optionally include one or more microphones and perform the functions of an NMD. PBDs and VPDs may be generally referred to as media playback devices.

Each of the above-described VEDs may implement at least some voice control functionality, which allows the VED (individually or perhaps in combination with one or more other computing devices) to act upon voice commands received via its microphones, thereby allowing a user to control the VED and perhaps other devices, too.

Further embodiments include tangible, non-transitory computer-readable media having stored thereon program instructions that, upon execution by a computing device, cause the computing device to perform the features and functions disclosed and described herein.

Some embodiments include a computing device comprising at least one processor, as well as data storage and program instructions. In operation, the program instructions are stored in the data storage, and upon execution by the at least one processor, cause the computing device (individually or in combination with other components or systems) to perform the features and functions disclosed and described herein.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
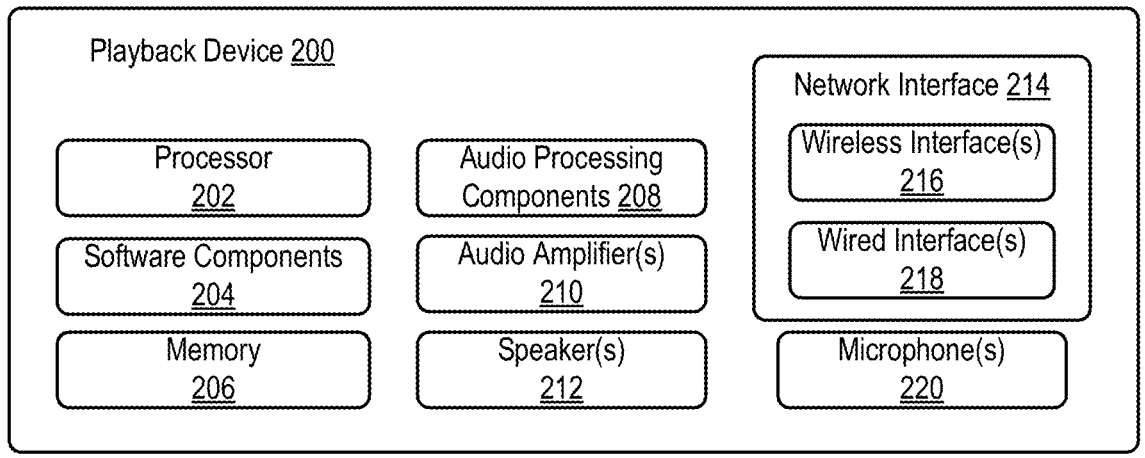
FIG. 2 shows a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 is one type of voice-enabled device (VED).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network, including but not limited to data to/from other VEDs (e.g., commands to perform an SPL measurement, SPL measurement data, commands to set a system response volume, and other data and/or commands to facilitate performance of the features and functions disclosed and described herein). As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices and/or other VEDs. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
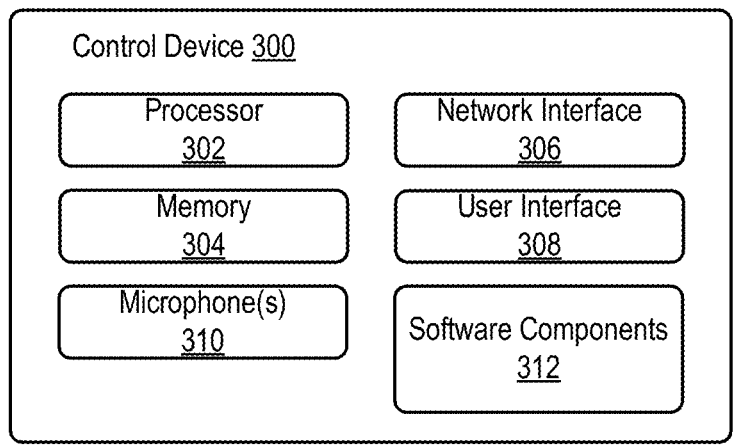
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
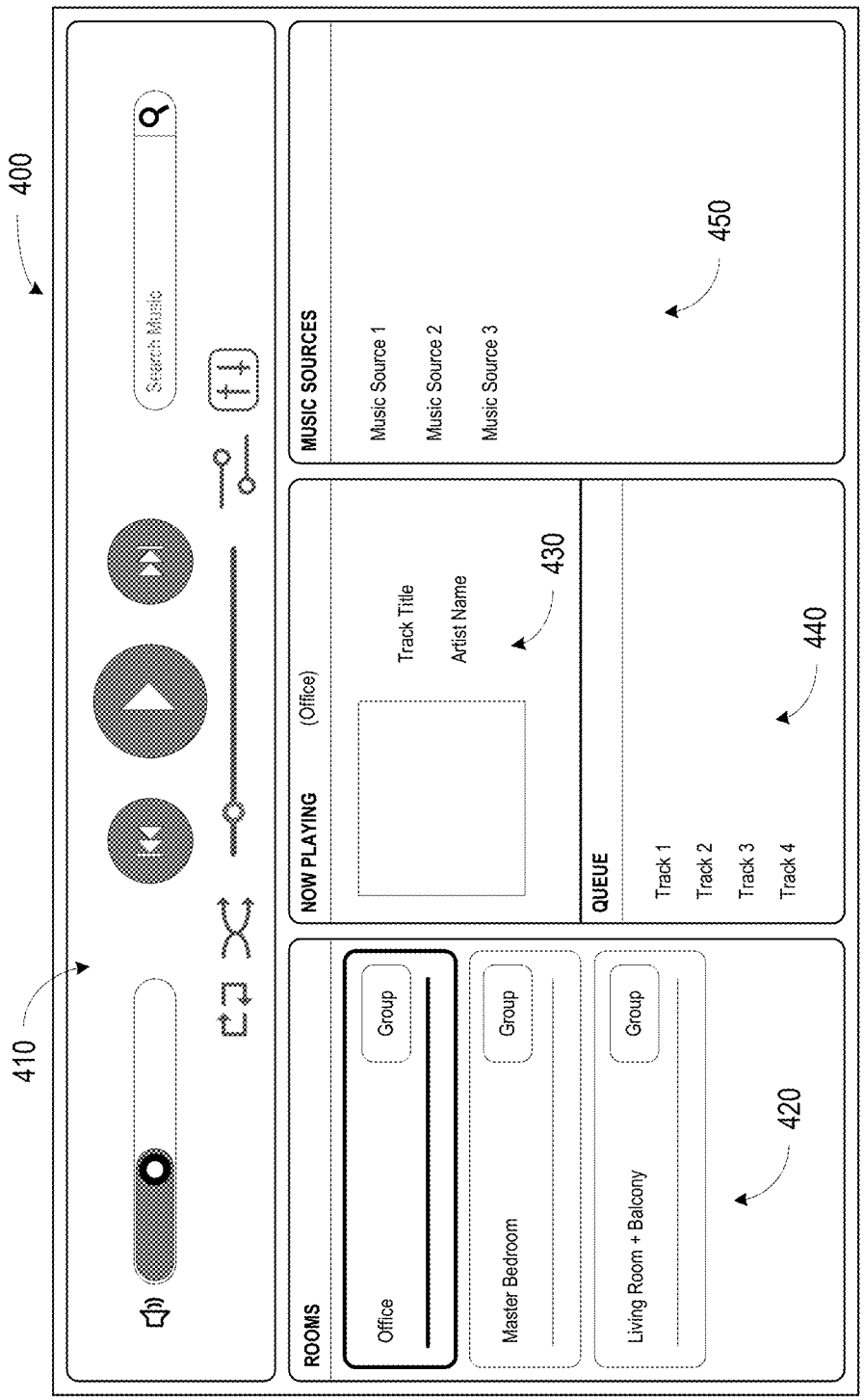
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Network devices

Figure 5:
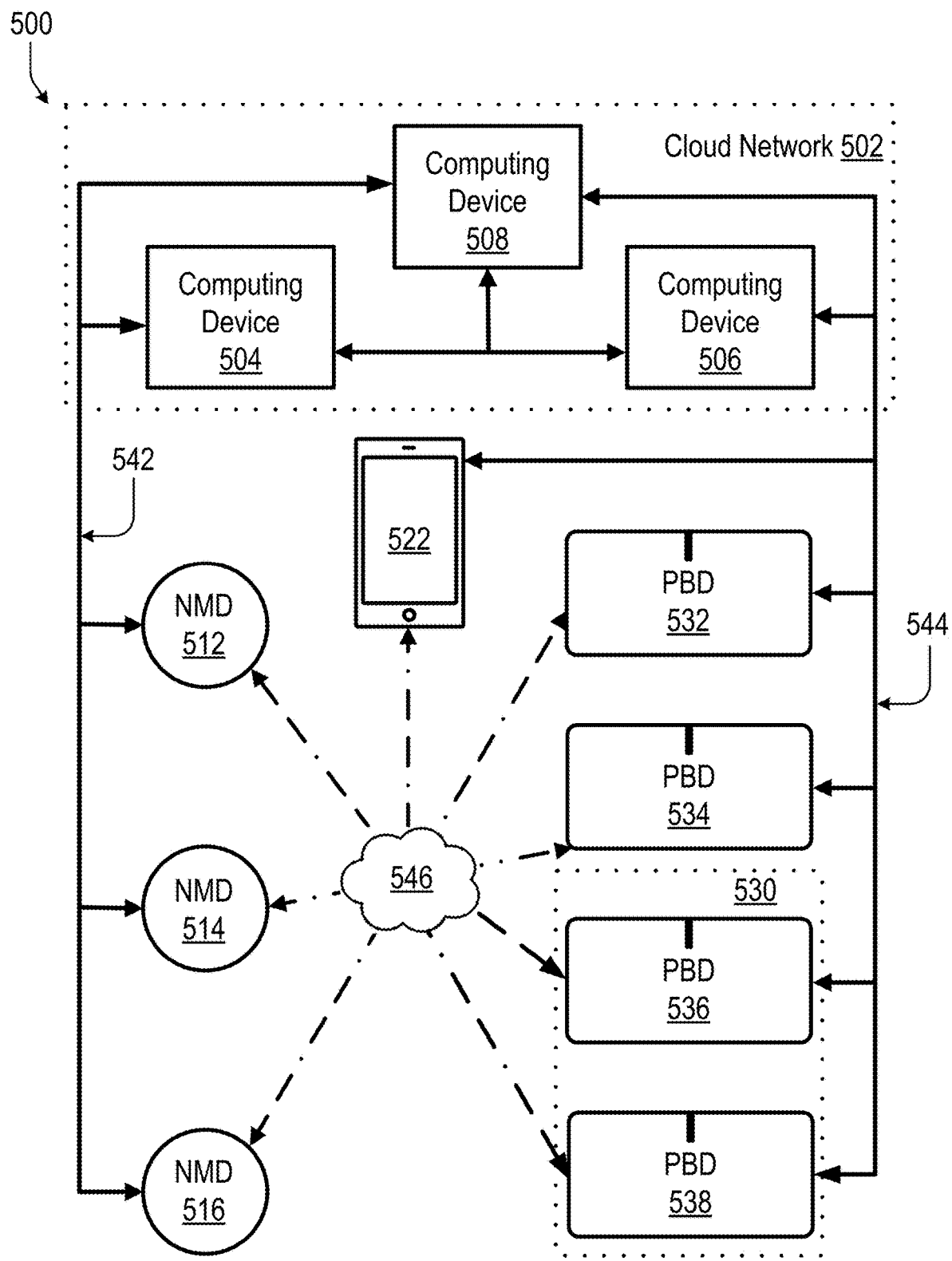
FIG. 5 shows an example plurality of network devices.

FIG. 5 shows an example plurality of network devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of network devices 500 includes computing devices 504, 506, and 508; network microphone devices (NMDs) 512, 514, 516, and 518; playback devices (PBDs) 532, 534, 536, and 538; and a controller device 522. As described previously, any one or more (or all) of the NMDs 512-16, PBDs 532-38, and/or controller device 522 may be VEDs. For example, in some embodiments PBD 532 and 536 may be VEDs, while PBD 534 and 538 may not be VEDs.

Each of the plurality of network devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service, while computing device 506 may be associated a voice-assistant service (e.g., an Alexa®, Google Assistant®, or other voice service) for processing voice input that has been captured after detection of the wake word. As an example, a VED may transmit a captured voice input (e.g., a voice utterance and a wake word) or a portion thereof (e.g., just voice utterance following the wake word) over a data network to the computing device 506 for speech processing. The computing device 506 may employ a text to speech engine to convert a voice input into text, which can be processed to determine an underlying intent of a voice utterance. The computing device 506 or another computing device can send a corresponding response to the voice input to a VED, such as a response comprising as its payload one or more of an audible output (e.g., a voice response to a query and/or an acknowledgment) and/or an instruction intended for one or more of the network devices of local system. The instruction may include, for example, a command for initiating, pausing, resuming, or stopping playback of audio content on one or more network devices, increasing/decreasing playback volume, retrieving a track or playlist corresponding to an audio queue via a certain URI or URL, etc. Additional examples of voice processing to determine intent and responding to voice inputs can be found, for example, in previously referenced U.S. patent application Ser. No. 15/721,141.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 is configured to interface with controller device 522 and PBDs 532, 534, 536, and 538 via communication path 544. In one example, controller device 522 may be a network device such as the network device 200 of FIG. 2. Accordingly, controller device 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, controller device 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or controller device 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, controller device 522 and PBDs 532, 534, 536, and 538 may be part of a local area network and/or a local playback network as discussed in previous sections, and the communication path 544 may include an access point that links the local area network and/or local playback network of controller device 522 and PBDs 532, 534, 536, and 538 to the computing device 506 over a WAN. As such, each of the controller device 522 and PBDs 532, 534, 536, and 538 may also communicate with each over such an access point.

In one example, communication paths 542 and 544 may comprise the same access point. In an example, each of the NMDs 512, 514, and 516, controller device 522, and PBDs 532, 534, 536, and 538 may access the cloud network 502 via the same access point for a household.

As shown in FIG. 5, each of the NMDs 512, 514, and 516, controller device 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, controller device 522 may communicate with NMD 512 over Bluetooth™, and communicate with PBD 534 over another local area network. In another example, NMD 514 may communicate with controller device 522 over another local area network, and communicate with PBD 536 over Bluetooth™. In a further example, each of the PBDs 532, 534, 536, and 538 may communicate with each other according to a spanning tree protocol over a local playback network, while each communicating with controller device 522 over a local area network, different from the local playback network. Other examples are also possible.

In some cases, communication means between the NMDs 512, 514, and 516, controller device 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above are just some illustrative examples, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as controller device 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
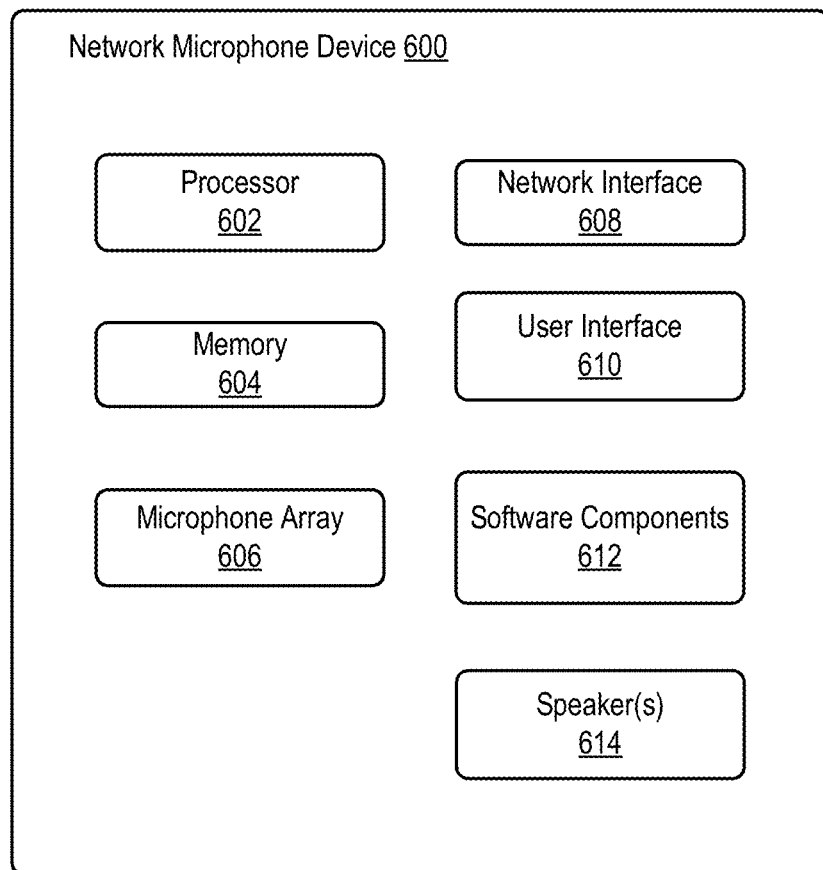
FIG. 6 shows a functional block diagram of an example network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, controller device 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Noise Suppression Systems and Methods

Figure 7A:
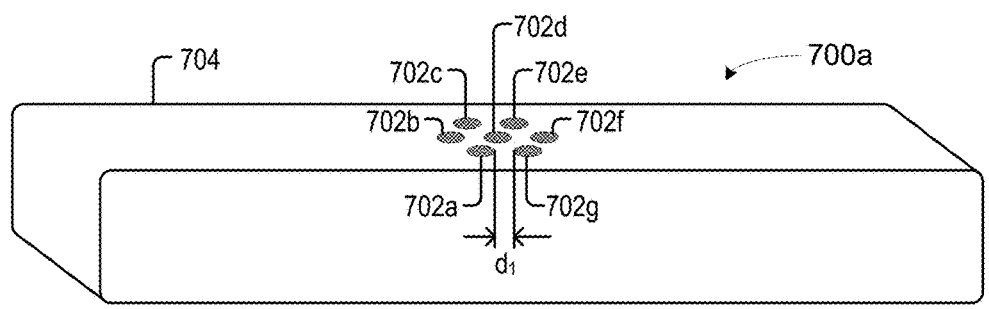
FIG. 7A shows an example network device having microphones arranged in a beamforming array according to some embodiments.
Figure 7B:
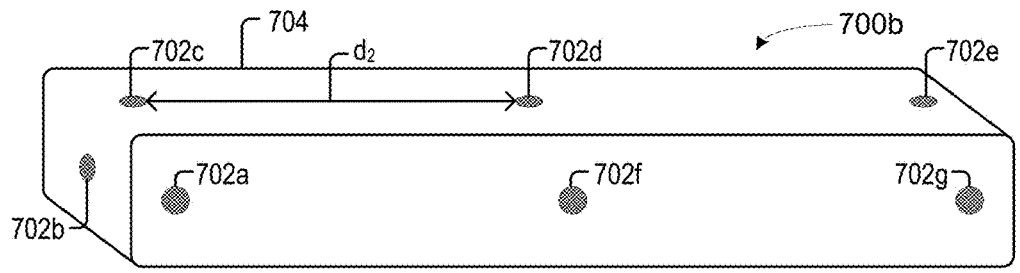
FIG. 7B shows an example network device having microphones arranged in a disarrayed fashion according to some embodiments.
Figure 7C:
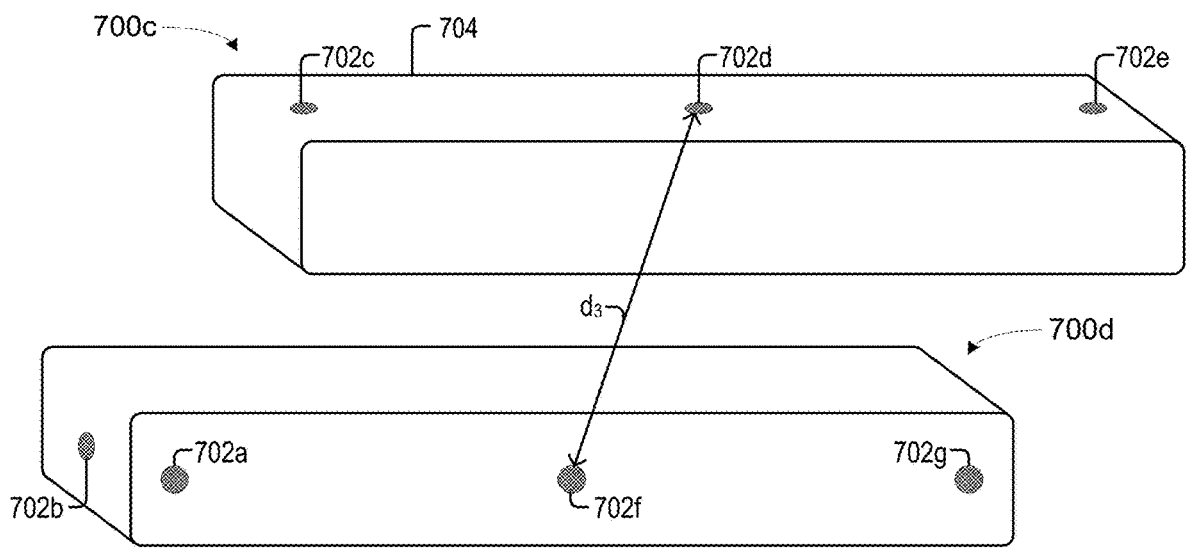
FIG. 7C shows two example network devices having microphones arranged across both devices, according to some embodiments.

FIGS. 7A-7C depict network devices 700 (identified individually as network devices 700a-700d). Each of the network devices 700 comprises a housing 704 that at least partially encloses certain components (not shown) of the network device within an enclosure, such as the amplifiers, transducers, processors, and antenna. The network devices 700 further comprise microphones 702 (identified individually as microphones 702a-g) disposed at various locations of the housing 704. For example, network device 700a comprises a structured array of the microphones 702. In some embodiments, the microphones 702 may be seated within and/or exposed through an aperture in the housing 704. Network device 700a may be configured to be one or more of NMDs 512, 514, and 516 of FIG. 5, and/or any of the VEDs disclosed and described herein.

As discussed above, embodiments described herein facilitate suppressing noise from audio content captured by multiple microphones in order to help detect the presence of a wake word in the captured audio content. Some noise suppression processes involve single-microphone techniques for suppressing certain frequencies at which noise is dominant over speech content. However, these techniques can result in significant distortion of the speech content. Other noise suppression processes involve beamforming techniques in which a structured array of microphones is used to capture audio content from specific directions where speech is dominant over noise content and disregard audio content from directions where noise is dominant over speech content.

Figure 11:
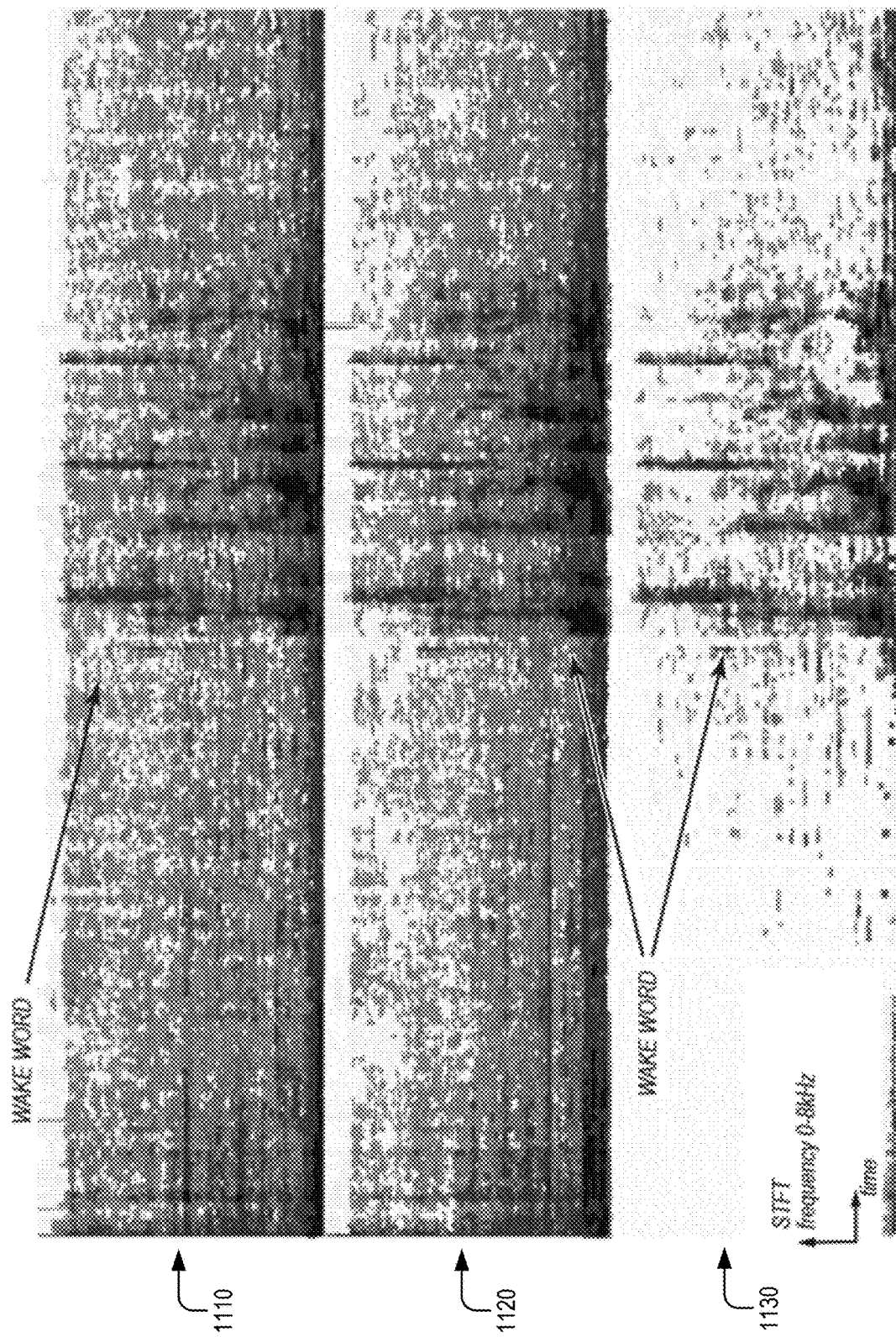
FIG. 11 shows experimental results of wake word detection improvement over a static beamforming technique.

While effective for suppressing unwanted noise when capturing audio content, beamforming has limitations. For example, traditional beamforming may be generally suboptimal at detecting voice input compared to the enhanced suppression techniques described below. FIG. 11, for example, shows significant wake word detection improvement using a multi-channel Wiener filter (MCWF) algorithm described below relative to traditional static beamforming under the same conditions, which involved (1) detecting a wake word from a noisy sound sample having an SNR of −15 dB (2) while playing back the same sample audio track ("Relax" by Frankie Goes to Hollywood), and (3) using the same NMD for each test (the NMD for testing had an array of six microphones spaced apart from one another within a suitable distance for traditional beamforming). FIG. 11 depicts the results for three different test cases under the test conditions: (1) plot 1110 depicting the detected sound sample without using beamforming or the MCWF algorithm, (2) plot 1120 depicting the detected sound sample using beamforming, and (3) plot 1130 depicting the detected sound sample using an MCWF-based algorithm. In each of plots 1110, 1120, and 1130, the x-axis represents time, the y-axis corresponds to frequency, and the darkness of the plot represents the intensity of the detected sound sample in dB (where intensity increases as darkness increases). Further, in each of plots 1110, 1120, and 1130, the wake word (identified in FIG. 11 by arrows) begins approximately halfway along the x-axis and ends about three-quarters along the x-axis. Comparing plot 1120 to plot 1110, it can be seen that beamforming removed some of the noise, but a significant amount of noise still remained. However, comparing plot 1130 to plot 1120, it can be seen that the MCWF algorithm filtered out substantially more noise than the beamforming, such that the wake word can be more readily identified from the MCWF filtered sound sample than from the beamforming filtered sound sample.

Additionally, beamforming typically requires a known array configuration, and the network device 700 selectively captures audio from particular directions relative to the array. Beamforming may only be feasible in scenarios in which it is possible to implement such an array of microphones 702. For instance, if the microphones 702 and processing components of the network device 700a of FIG. 7A were configured for traditional beamforming, the spacing or distance $d_1$ between neighboring microphones 702 would be limited to a theoretical maximum of about 4.25 cm using traditional aliasing-free beamforming at frequencies up to 4 kHz. However, some network devices may not be capable of supporting an array of microphones 702 spaced so closely, due to hardware or other design constraints. Accordingly, the distance $d_1$ between the microphones 702 in various embodiments may not be restructured to such a theoretical maximum when using the enhanced noise suppression techniques described herein.

FIG. 7B, for example, depicts the network device 700b with the microphones 702 arranged in a disarrayed fashion. As used herein, the term "disarrayed fashion" refers to any arrangement of microphones that is not used as a beamforming array. As such, microphones arranged in a disarrayed fashion may be arranged in arbitrary order relative to one another; positioned more conveniently along the housing, such as between, speakers, electronics, buttons, and/or other components; and/or arranged in some order, but in an order that does not (or at least may not) support beamforming. For instance, as shown in FIG. 7B, the microphones 702 appear to be arranged according to a particular geometric configuration, with microphones 702a, 702b, 702f, and 702g being arranged in a first horizontal plane and microphones 702c, 702d, and 702e being arranged in a second horizontal plane. However, even though the arrangement of the microphones 702 in FIG. 7B includes some aspect of order, the arrangement is referred to as "disarrayed" because the microphones 702 are too spread out from one another to perform beamforming, or at least too spread out from one another to perform beamforming effectively for the types of voice applications disclosed and described herein. In some implementations, a minimum distance between two given microphone is greater than 5 cm. For example, a spacing or distance $d_2$ between the microphone 702c and 702d or any other set of two or more microphones may be between 5 cm and 60 cm.

FIG. 7C depicts the microphones 702 spread across multiple network devices, according to an example embodiment. In particular, microphones 702c, 702d, and 702e are disposed in the housing 704 of network device 700c, and microphones 702a, 702b, 702f, and 702g are disposed in the housing 704 of network device 700d. In some embodiments, network devices 700c and 700d are located in the same room (e.g., as separate devices in a home theater configuration), but in different areas of the room. In such embodiments, a spacing or distance between the microphones 702 on network devices 700c and 700d, such as distance $d_3$ between microphone 702d and 702f, may exceed 60 cm. For example, distance $d_3$ between microphone 702d and 702f or any other set of two or more microphones respectively disposed on separate network devices may be between 1 and 5 meters.

In each of the arrangements depicted in FIGS. 7A-C, the network devices 700 employ multi-microphone noise suppression techniques that do not necessarily rely on the geometrical arrangement of the microphones 702. Instead, techniques for suppressing noise in accordance with various embodiments involve linear time-invariant filtering of an observed noisy process, assuming known stationary signal and noise spectra, and additive noise. The network device 700 uses first audio content captured by one or more of the microphones 702 to estimate noise in second audio content that is concurrently being captured by one or more other ones of the microphones 702. For instance, microphone 702a captures first audio content while microphone 702g concurrently captures second audio content. If a user proximate to the network device 700 speaks a voice command, then speech content in both the first audio content captured by microphone 702a and the second audio content captured by microphone 702g includes the same voice command. Further, if a noise source is proximate to the network device 700, then both the first audio content captured by microphone 702a and the second audio content captured by microphone 702g includes noise content from the noise source.

However, because microphone 702a and 702g are spaced apart from one another, the strength of the speech content and noise content may vary between the first audio content and the second audio content. For instance, if microphone 702a is closer to the noise source and microphone 702g is closer to the speaking user, then the noise content can dominate the first audio content captured by microphone 702a, and the speech content can dominate the second audio content captured by microphone 702g. And if the noise content dominates the first audio content, then the network device 700 can use the first audio content to generate an estimate of the noise content that is present in the second audio content. The estimated noise from the first audio content can then be used to filter out noise and preserve speech in the second audio content.

In some embodiments, the network device 700 carries out this process concurrently for all of the microphones 702, such that noise content captured by each microphone is used to estimate the noise content captured by each other microphone. The network device 700 filters the respective audio signals captured by each of the microphones 702 using the estimated noise content to suppress the respective noise content in each audio signal, and then combines the filtered audio signals. With the noise content of each audio signal being suppressed, the dominant content of each audio signal is speech content, and so the combined audio signal is also speech-dominant.

An example MCWF algorithm for carrying out these processes is described in further detail below in connection with FIG. 8.

Figure 8:
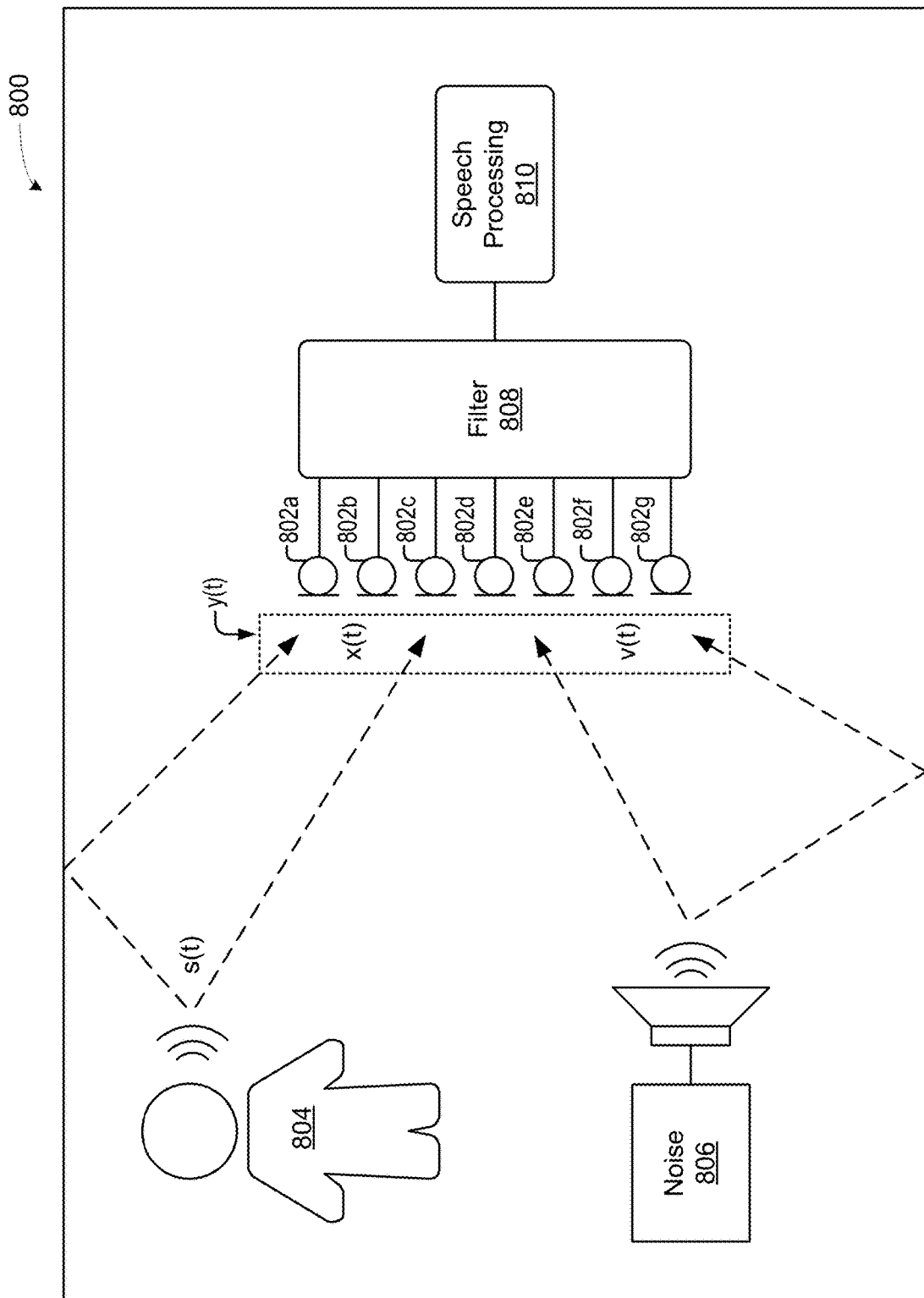
FIG. 8 shows an example network configuration in which certain embodiments may be practiced.

FIG. 8 depicts an example environment 800 in which such a noise suppression process is performed. The environment 800 includes multiple microphones 802 (identified individually as microphones 802a-g) for capturing audio content. The microphones 802 may be configured to be one or more of microphones 702 of FIGS. 7A-C. As shown, the environment 800 includes seven microphones 802, but in other embodiments, the environment 800 includes additional or fewer microphones. In some embodiments, the microphones 802 are arranged on or within a single network device, such as network device 700. In other embodiments, one or more of the microphones 802 are arranged on or within one network device, and the remaining microphones are arranged on or within one or more other network devices.

In practice, the microphones 802 capture audio content that reaches the microphones 802. As shown, when a person 804 speaks near the microphones 802, the person 804 produces a speech signal s(t). As the speech signal s(t) propagates throughout the environment 800, at least some of the speech signal s(t) reflects off of walls or other nearby objects in the environment 800. These reflections can distort the speech signal s(t), such that the version of the speech signal captured by the microphones 802 is a reverberated speech signal x(t) that is different from the original speech signal s(t).

Further, the environment 800 includes one or more noise sources 806, such as noise from nearby traffic or construction, noise from people moving throughout the environment, noise from one or more playback devices in the environment 800, or any other ambient noise. In some embodiments, the noise source 806 includes speech content from a person different from person 804. In any case, the noise source 806 produces a noise signal v(t) that is captured by some or all of the microphones 802. In this regard, the audio signal captured by the microphones 802 is represented as y(t), which is the sum of the reverberated speech signal x(t) and the noise signal v(t). And for each individual microphone of the microphones 802, the captured audio signal can thus be characterized as:

$$y_n(t)=x_n(t)+v_n(t), n=1,2,\ldots,N \quad \text{(Eq. 1)}$$

where n is the index for the reference microphone, and N is the total number of microphones. Transforming from the time domain to the frequency domain, the above equation can be expressed as:

$$Y_n(f)=X_n(f)+V_n(f), n=1,2,\ldots,N \quad \text{(Eq. 2)}$$

or, in vector form, as:

$$Y(f)=X(f)+V(f) \quad \text{(Eq. 3)}$$

Further, power spectrum density (PSD) matrices $P_{yy}(f)$, $P_{xx}(f)$, and $P_{vv}(f)$ are defined, where $P_{yy}(f)$ is the PSD matrix for the total captured audio content, $P_{xx}(f)$ is the PSD matrix for the speech portion of the total captured audio content, and $P_{vv}(f)$ is the PSD matrix for the noise portion of the total captured audio content. These PSD matrices are determined using the following equations:

$$P_{yy}(f)=E\{y(f)y^H(f)\}, \quad \text{(Eq. 4)}$$

$$P_{xx}(f)=E\{x(f)x^H(f)\}, \quad \text{(Eq. 5)}$$

$$P_{vv}(f)=E\{v(f)v^H(f)\} \quad \text{(Eq. 6)}$$

where E{ } represents the expected value operator and H represents the Hermitian transpose operator. Assuming a lack of correlation between the speech portion and the noise portion of the total captured audio content, which is typically the case, the PSD matrix for the speech portion of the total captured audio content can be written as:

$$P_{xx}(f)=P_{yy}(f)-P_{vv}(f). \quad \text{(Eq. 7)}$$

In order to reduce the noise content V(f) and recover the speech content X(f) of the captured multi-channel audio content Y(f), the captured multi-channel audio content Y(f) is passed through a filter 808. In some embodiments, the filter 808 comprises tangible, non-transitory computer-readable media that, when executed by one or more processors of a network device, cause the network device to perform the multi-channel filtering functions disclosed and described herein.

The filter 808 can filter the captured multi-channel audio content Y(f) in various ways. In some embodiments, the filter 808 applies linear filters $h_i(f)$ (where i=1, 2, ..., N is the index of the reference microphone) to the vector Y(f) of the captured multi-channel audio content. In this manner, N linear filters $h_i(f)$ (one for each of the microphones 802) are applied to the audio content vector Y(f). Applying these filters produces a filtered output $Z_i(f)$ given by:

$$Z_i(f)=h_i^H(f)X(f)+h_i^H(f)V(f), i=1,2,\ldots,N. \quad \text{(Eq. 8)}$$

This filtered output $Z_i(f)$ includes a filtered speech component $D_i(f)$ and a residual noise component $v_i(f)$, where $$D_i(f)=h_i^H(f)X(f) \quad \text{(Eq. 9)}$$

and $$v_i(f)=h_i^H(f)V(f). \quad \text{(Eq. 10)}$$

In order to determine the linear filters $h_i(f)$, a set of optimization constraints are defined. In some embodiments, the optimization constraints are defined so as to maximize the extent of noise reduction while limiting the extent of signal distortion, for instance, by limiting the extent of signal distortion to be less than or equal to a threshold extent. A noise reduction factor $\xi_{nr}(h_i(f))$ is defined as:

$$\xi_{nr}(h_i(f)) = \frac{[u_i - h_i(f)]^H P_{xx}(f)[u_i - h_i(f)]}{\phi_{x_i x_i}(f)}, \quad \text{(Eq. 11)}$$

and a signal distortion index $v_{sd}(h_i(f))$ is defined as:

$$v_{sd}(h_i(f)) = \frac{\phi_{v_i v_i}(f)}{h_i(f)^H P_{vv}(f) h_i(f)}, \quad \text{(Eq. 12)}$$

where $u_i$ is the i-th standard basis vector and is defined as $$u_i = \begin{bmatrix} 0 & \ldots & 0 & \underbrace{1}_{i\text{-th}} & 0 & \ldots & 0 \end{bmatrix}^T. \quad \text{(Eq. 13)}$$

Thus, in order to maximize noise reduction, while limiting signal distortion, the optimization problem in some implementations is to maximize $\xi_{nr}(h_i(f))$ subject to $v_{sd}(h_i(f)) \leq \sigma^2(f)$. To find the solution associated with this optimization problem, the derivative of the associated Lagrangian function with respect to $h_i(f)$ is set to zero, and the resulting closed form solution is:

$$h_i(f) = [P_{xx}(f) + \beta P_{vv}(f)]^{-} P_{xx}(f) u_i \quad \text{(Eq. 14)}$$

where $\beta$ (which is a positive value and the inverse of the Lagrange multiplier) is a factor that allows for tuning the signal distortion and noise reduction at the output of $h_i(f)$.

Implementation of such a linear filter $h_i(f)$ can be computationally demanding. To reduce the computational complexity of the filter $h_i(f)$, a more simplified form is obtained in some embodiments by taking advantage of the fact that the matrix $P_{xx}(f)$ is a rank one matrix. And because $P_{xx}(f)$ is a rank one matrix, $P^{-1}_{vv}(f) P_{xx}(f)$ is also of rank one. In addition, the matrix inversion can be further simplified using the Woodbury matrix identity. Applying all of these concepts, the linear filter $h_i(f)$ can be expressed as:

$$h_i(f) = \frac{P_{vv}^{-1}(f) P_{yy}(f) - I_N}{\beta + \lambda(f)} u_i \quad \text{(Eq. 15)}$$

where $$\lambda(f) = tr\{P_{vv}^{-1}(f) P_{yy}(f)\} - N \quad \text{(Eq. 16)}$$

is the unique positive eigenvalue of $P^{-1}_{vv}(f) P_{xx}(f)$ and acts as a normalizing factor.

One advantage of this linear filter $h_i(f)$ is that it only depends on the PSD matrices for the total captured audio and the noise portion of the total captured audio, and so it does not depend on the speech portion of the total captured audio. Another advantage is that the $\beta$ parameter allows for customizing the extent of noise reduction and signal distortion. For instance, increasing $\beta$ increases the noise reduction at the cost of increased signal distortion, and decreasing $\beta$ decreases the signal distortion at the cost of increased noise.

Because the linear filter $h_i(f)$ depends on the PSD matrices for the total captured audio $P_{yy}(f)$ and the noise portion of the total captured audio $P_{vv}(f)$, these PSD matrices are estimated in order to apply the filter. In some embodiments, first order exponential smoothing is used to estimate $P_{yy}$ as:

$$P_{yy}(n) = \alpha_y P_{yy}(n-1) + (1-\alpha_y) y y^H \quad \text{(Eq. 17)}$$

where $\alpha_y$ is the smoothing coefficient and where n denotes the time-frame index. Also, for simplifying the notation, the frequency index (f) has been dropped from this equation and from the equations below, but it will be understood that the processes disclosed herein are carried out for each frequency bin. The smoothing coefficient $\alpha_y$ is a value between 0 and 1, and can be adjusted to tune the estimation of $P_{yy}$. Increasing $\alpha_y$ increases the smoothness of the $P_{yy}$ estimation by reducing the extent of change of $P_{yy}$ between consecutive time-frame indices, while reducing $\alpha_y$ reduces the smoothness of the $P_{yy}$ estimation by increasing the extent of change of $P_{yy}$ between consecutive time-frame indices.

To estimate $P_{vv}$, the filter 808 determines, in some embodiments, whether speech content is present in each frequency bin. If the filter 808 determines that speech content is present or is likely present in a particular frequency bin, then the filter 808 determines that the frequency bin is not representative of noise content, and the filter 808 does not use that frequency bin to estimate $P_{vv}$. On the other hand, if the filter 808 determines that speech content is not present or is unlikely present in a particular frequency bin, then the filter 808 determines that the frequency bin is made up mostly or entirely of noise content, and the filter 808 then uses that noise content to estimate P.

The filter 808 can determine whether speech content is present in a frequency bin in various ways. In some embodiments, the filter 808 makes such a determination using hard voice activity detection (VAD) algorithms. In other embodiments, the filter 808 makes such a determination using softer speech presence probability algorithms. For instance, assuming a Gaussian distribution, the speech presence probability is calculated as:

$$P(\text{Speech Presence} \mid n) \triangleq P(H_1 \mid y) = \left(1 + \frac{q}{1-q}(1+\xi)e^{-\gamma/(1+\xi)}\right)^{-1} \quad \text{(Eq. 18)}$$

where n is the time-frame index, where $$\xi = tr\{P_{vv}^{-1}(n-1) P_{xx}(n)\}, \quad \text{(Eq. 19)}$$

$$\gamma = y^H P_{vv}^{-1}(n-1) P_{xx}(n) P_{vv}^{-1}(n-1) y, \quad \text{(Eq. 20)}$$

and where $$q \triangleq P(H_0) \quad \text{(Eq. 21)}$$

is the a priori probability of speech absence. The derivation of this speech presence probability is described in Souden et al., "*Gaussian Model-Based Multichannel Speech Presence Probability*," IEEE Transactions on Audio, Speech, and Language Processing (2010), which is hereby incorporated by reference in its entirety.

Notably, the speech presence probability calculation depends on the PSD matrix of the speech content $P_{xx}$. However, because $P_{xx}(f) = P_{yy}(f) - P_{vv}(f)$, this dependency can be removed by rewriting $\gamma$ as:

$$\gamma = y^H P_{vv}^{-1}(n-1) P_{yy}(n) P_{vv}^{-1}(n-1) y - y^H P_{vv}^{-1}(n-1) y \quad \text{(Eq. 22)}$$

Further, the variable $\xi$ can be written as:

$$\xi = \hat{\psi} - N, \quad \text{(Eq. 23)}$$

where $$\begin{aligned}
\hat{\psi} &= tr\{P_{vv}^{-1}(n-1) P_{yy}(n)\} \\
&= tr\{P_{vv}^{-1}(n-1)(\alpha_y P_{yy}(n-1) + (1-\alpha_y) y y^H)\} \\
&= \alpha_y tr\{P_{vv}^{-1}(n-1) P_{yy}(n-1)\} + \\
&\quad (1-\alpha_y) tr\{y^H P_{vv}^{-1}(n-1) y\} \\
&= \alpha_y \lambda(n-1) + (1-\alpha_y)\psi, \text{ where}
\end{aligned} \quad \text{(Eq. 24)}$$

$$\lambda(n) = tr\{P_{vv}^{-1}(n) P_{yy}(n)\}, \quad \text{(Eq. 25)}$$

and where $$\psi = y^H P_{vv}^{-1}(n-1) y. \quad \text{(Eq. 26)}$$

The computational complexity of the speech presence probability calculation can be further reduced by defining the vector:

$$y_{temp} = P_{vv}^{-1}(n-1) y \quad \text{(Eq. 27)}$$

such that $\psi$ can be written as:

$$\psi = y^H P_{vv}^{-1}(n-1) y = y^H y_{temp} \quad \text{(Eq. 28)}$$

and $\gamma$ can be written as:

$$\gamma = y_{temp}^H P_{yy}(n) y_{temp} - \psi. \quad \text{(Eq. 29)}$$

Accordingly, by calculating $Y_{temp}$ before attempting to calculate ψ or γ, duplicate calculations can be avoided when the filter 808 determines the speech presence probability.

Once the speech presence probability is determined for a given time-frame, the filter 808 updates the estimate of the noise covariance matrix by employing the expectation operator according to the following equation:

$$P_{vv}(n) = E\{vv^H \mid P(H_1)\} \quad \text{(Eq. 30)}$$
$$= P(H_1 \mid y)P_{vv}(n-1) + (1 - P(H_1 \mid y))$$
$$(\alpha_v P_{vv}(n-1) + (1-\alpha_v)yy^H)$$
$$= \widehat{\alpha_v} P_{vv}(n-1) + (1-\widehat{\alpha_v})yy^H$$

where $$\widehat{\alpha_v} = \alpha_v + (1-\alpha_v)P(H_1 \mid y) \quad \text{(Eq. 31)}$$

is the effective frequency-dependent smoothing coefficient.

In order to get the updated $P^{-1}_{vv}(n)$ for use in $h_i(f)$, the Sherman-Morrison formula is used as follows:

$$k(n) = \frac{P^{-1}_{vv}(n-1)y}{w + y^H P^{-1}_{vv}(n-1)y} = \frac{y_{temp}}{w + \psi} \quad \text{(Eq. 32)}$$

$$P^{-1}_{vv}(n) = \frac{1}{\widehat{\alpha_v}}(P^{-1}_{vv}(n-1) - k(n)y^H P^{-1}_{vv}(n-1)) \quad \text{(Eq. 33)}$$

$$= \frac{1}{\widehat{\alpha_v}}(P^{-1}_{vv}(n-1) - k(n)y^H_{temp})$$

where $$w = \max\left(\frac{\widehat{\alpha_v}}{1-\widehat{\alpha_v}}, eps\right). \quad \text{(Eq. 34)}$$

Once the updated $P^{-1}_{vv}(n)$ is determined, the filter 808 can determine and apply the linear filter $h_i(n)$, for all values of f and all values of i, to the captured audio content. The output of the filter 808 is then given as $y_{o,i}(n) = h^H_i(n)y(n)$. In some embodiments, the filter 808 computes the output in parallel for all i using a matrix H(n) in which the columns are $h_i(n)$ such that $$H = \frac{P^{-1}_{vv}(n)P_{yy}(n) - I_N}{\beta + \xi} \quad \text{(Eq. 35)}$$

and $$y_{out} = H^H y, \quad \text{(Eq. 36)}$$

where $$\lambda(n) = tr\{P^{-1}_{vv}(n)P_{yy}(n)\} \quad \text{(Eq. 37)}$$

and $$\xi = \lambda(n) - N. \quad \text{(Eq. 38)}$$

In some embodiments, the filter 808 does not calculate H directly, which requires matrix by matrix multiplication. Instead, the computational complexity is reduced significantly by the filter 808 computing the output as follows:

$$\hat{y} = P^{-1}_{vv}(n)y \quad \text{(Eq. 39)}$$

and $$y_{out} = \frac{1}{\beta + \xi}(P_{yy}(n)\hat{y} - y). \quad \text{(Eq. 40)}$$

Employing the above concepts, the filter 808 suppresses noise and preserves speech content in a multi-channel audio signal captured by the microphones 802. In a simplified manner this may comprise A. Update $P_{yy}(n)$ for all f
B. Calculate the speech presence probability $P(H_1|y(n))$ for all f
C. Update $P^{-1}_{vv}(n)$ for all f using the speech presence probability
D. Compute the linear filter $h_i(n)$ for all f and all i, and calculate the output as $y_{o,i}(n) = h^H_i(n)y(n)$ A more detailed example may comprise carrying out the following steps.

Step 1: Initialize parameters and state variables at time-frame 0. In some embodiments, $P_{yy}$ and $P^{-1}_{vv}$ are initialized by estimating $P_{yy}$ for a certain period of time (e.g., 500 ms) and then using the estimated $P_{yy}$ to initialize $P^{-1}_{vv}$ as its inverse.

Step 2: At each time-frame n, perform the following steps 3-13.

Step 3: For each frequency index f={1, ..., K}, update the estimate of $P_{yy}(n)$ according to Equation 17, compute $y_{temp}$ according to Equation 27, and compute ψ according to Equation 28.

Step 4: For each frequency index f={1, ..., K}, use vector operations to compute ψ according to Equation 24.

Step 5: For each frequency index f={1, ..., K}, use vector operations to compute ξ according to Equation 23.

Step 6: For each frequency index f={1, ..., K}, compute γ according to Equation 29.

Step 7: Compute the speech presence probability over all frequency bins using vector operations according to Equation 18.

Step 8: Compute the effective smoothing coefficient $\hat{\alpha}_v$ for updating $P_{vv}(n)$ according to Equations 30 and 31.

Step 9: Compute w according to Equation 34.

Step 10: For each frequency index f={1, ..., K}, update k(n) according to Equation 32, and update $P^{-1}_{vv}(n)$ according to Equation 33.

Step 11: For each frequency index f={1, ..., K}, update λ(n) according to Equation 37.

Step 12: Compute ξ according to Equation 38.

Step 13: For each frequency index f={1, ..., K}, compute the output vector of size N×1 by computing $\hat{y}$ according to Equation 39 and computing the output $y_{out}$ according to Equation 40.

In addition to the other advantages already described, the above MCWF-based processing provides further advantages. For example, the filtering of the captured audio signals is carried out in a distributed manner, such that the audio signals do not need to be aggregated at a central node for processing. Further, the MCWF algorithm can be executed at an individual node where a microphone is present, and that node can then share its output from the MCWF algorithm with some or all of the other nodes in a networked system. For instance, each microphone of the microphones 702 in FIG. 7C is part of a respective node capable of executing the MCWF algorithm. As such, the node that includes microphone 702a processes the audio captured by microphone 702a in accordance with the MCWF algorithm, and then provides the MCWF output to the nodes associated with microphones 702b-g. Similarly, the node that includes microphone 702*a* receives the MCWF output from each of the nodes associated with microphones 702*b-g*. Each node can thus use the MCWF output from the other nodes when estimating and filtering out noise content in accordance with the MCWF algorithm.

Referring back to FIG. 8, once the filter 808 suppresses the noise content and preserves the speech content from the respective audio signals captured by the microphones 802, for instance using the MCWF algorithm described above, the filter 808 combines the filtered audio signals into a single signal. With the noise content of each audio signal being suppressed and the speech content being preserved, this combined signal similarly has suppressed noise content and preserved speech content.

The filter 808 provides the combined signal to a speech processing block 810 for further processing. The speech processing block 810 runs a wake word detection procedure for the output of the filter 808 to determine whether the speech content of the filter output includes a wake word. In some embodiments, the speech processing block 810 is implemented as software executed by one or more processors of the network device 700. In other embodiments, the speech processing block 810 is a separate computing system, such as one or more of computing devices 504, 506, and/or 508 shown and described with reference to FIG. 5.

In response to determining that the output of the filter 808 includes a wake word, the speech processing block 810 performs further speech processing of the output of the filter 808 to identify a voice command after the wake word. And responsive to the speech processing block 810 identifying a voice command after the wake word, the network device 700 carries out a task corresponding to the identified voice command. For example, as described above, in certain embodiments the network device 700 may transmit the voice input or a portion thereof to a remote computing device associated with, e.g., a voice assistant service.

In some embodiments, the robustness and performance of the MCWF may be enhanced based on one or more of the following adjustments to the foregoing algorithm.

1) The parameter β can be time-frequency dependent. There are various approaches to design a time-frequency dependent β depending on the speech presence probability, signal-to-diffuse ratio (SDR), etc. The idea is to use small values when the SDR is high and speech is present to reduce speech distortion, and use larger values when the SDR is low or speech is not present to increase noise reduction. This value provides a trade-off between noise reduction and speech distortion based on the conditional speech presence probability. A simple and effective approach is to define β as:

$$\beta(y) = \beta_0(\alpha_\beta + (1-\alpha_\beta)\beta_0 P(H1|y)$$

where the conditional speech presence probability is incorporated to adapt the parameter β based on the input vector y. The parameter $\alpha_\beta$ provides a compromise between a fixed tuning parameter and one purely dependent on probability of speech presence. In one implementation $\alpha_\beta = 0.5$.

2) The MMSE estimate of the desired speech signal can be obtained according to $$y_{out} = P(H_1|Y)H^H(n)y(n) + (1-P(H_1|y))G_{min}y$$

where the gain factor $G_{min}$ determines the maximum amount of noise reduction when the speech presence probability indicates that speech is not present. The importance of this model is that it mitigates speech distortions in case of a false decision on speech presence probability. This approach improves the robustness. The implementation can be done after step 13 of the algorithm, $y_{out}$ can be modified as $$y_{out} = P(H_1|y)y_{out} + (1-P(H_1|y))G_{min}y$$

where speech presence probability is utilized to generate the output and also controls how $G_{min}$ is being applied.

3) The algorithm is tuned and implemented in two supported modes. A) Noise Suppression (NS), B) Residual Echo Suppression (RES). If the speaker is playing content, the algorithm can be run in RES mode. Otherwise, the algorithm is run in NS mode. The mode can be determined using the internal state about existence of audio playback.

4) Initialization of covariance matrices in step 1 of the algorithm. The algorithm incorporates an initialization period where the input signal to the microphone array is used to estimate the initial input and noise covariance matrices. That can be assumed during this initialization period, speech is not present. These covariance matrices are initialized with diagonal matrices to simplify the implementation. The initialization time can be adjusted in the algorithm, such as to 0.5 second. This method provides a more robust solution which is not sensitive to input levels and noise type. As a result, relatively very similar convergence speeds across all SNR levels and loudness levels can be achieved.

5) In order to improve the multi-channel speech presence probability taking into account the statistical characteristics of the speech signal, one can use the recursively smoothed multi-channel speech presence probability as follows $$\overline{P}(n) = \alpha_p \overline{P}(n-1) + (1-\alpha_p)P(H_1|y),$$

where the smoothing coefficient $\alpha_p$ is a value between 0 and 1, and can be adjusted to tune the estimation of speech presence probability during the parameter tuning stage.

V. Example Noise Suppression Methods

Figure 9:
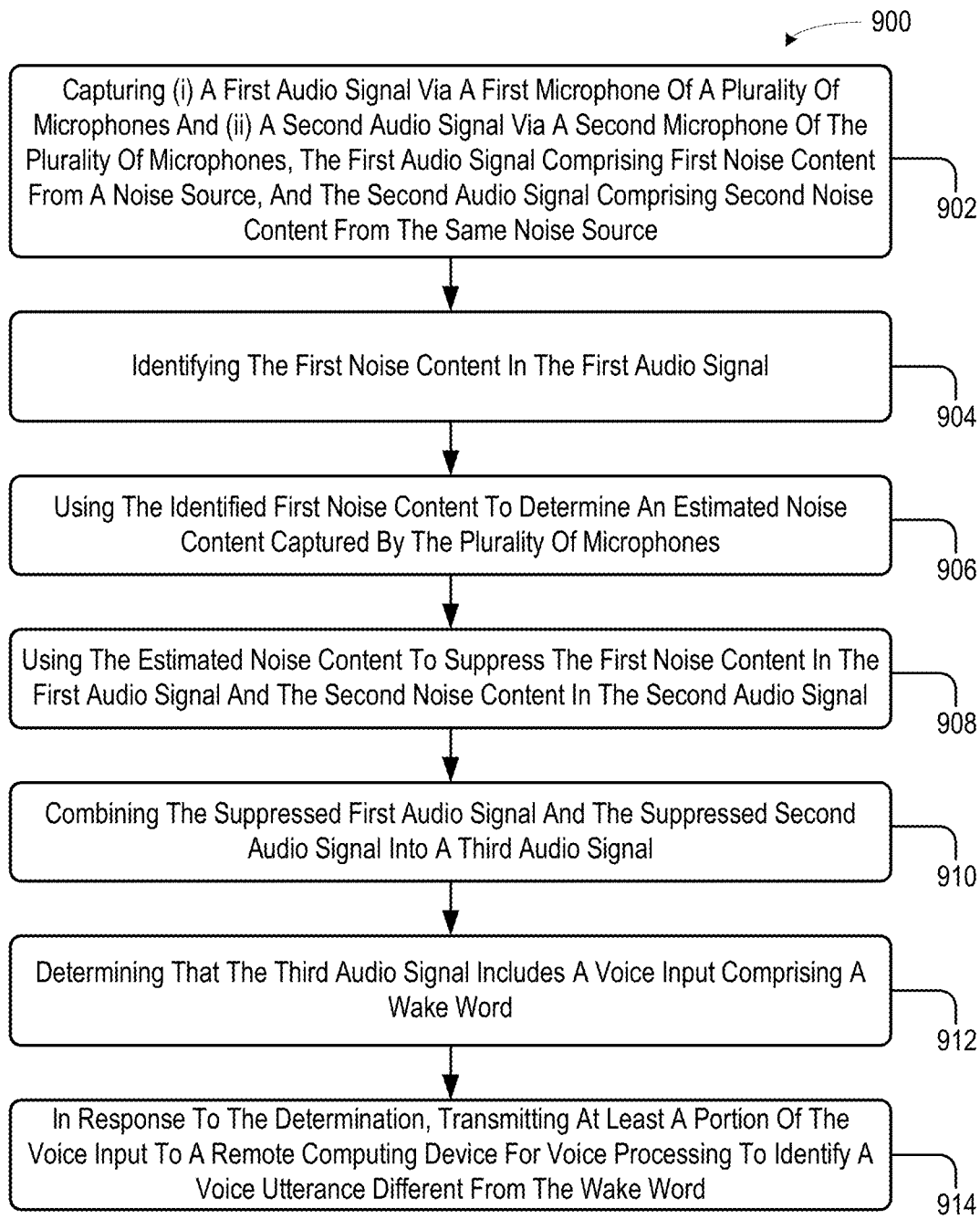
FIG. 9 shown an example method according to some embodiments.

FIG. 9 shows an example embodiment of a method 900 that can be implemented by a network device, such as network device 700 or any of the PBDs, NMDs, controller devices, or other VEDs disclosed and/or described herein, or any other voice-enabled device now known or later developed.

Various embodiments of method 900 include one or more operations, functions, and actions illustrated by blocks 902 through 914. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 900 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 9 may represent circuitry that is wired to perform the specific logical functions in the process.

Method 900 begins at block 902, which includes a network device capturing (i) a first audio signal via a first microphone of a plurality of microphones and (ii) a second audio signal via a second microphone of the plurality of microphones, where the first audio signal includes first noise content from a noise source and the second audio signal includes second noise content from that same noise source. In some embodiments, the plurality of microphones, including the first and second microphones, are components of the same network device, such as network devices 700a or 700b depicted in FIGS. 7A-B. In other embodiments, at least some microphones of the plurality of microphones are components of different network devices, for example, as depicted in FIG. 7C. In an example implementation, the first microphone is a component of a first network device, such as network device 700c, and the second microphone is a component of a second network device, such as network device 700d.

Next, method 900 advances to block 904, which includes identifying the first noise content in the first audio signal. In some embodiments, the step of identifying the first noise content in the first audio signal involves one or more of: (i) the network device using a VAD algorithm to detect that speech is not present in the first audio signal or (ii) the network device using a speech presence probability algorithm to determine a probability that speech is present in the first audio signal. An example of a speech presence probability algorithm is described above with respect to Equation 18. If the VAD algorithm detects that speech is not present in the first audio signal or if the speech presence probability algorithm indicates that the probability of speech being present in the first audio signal is below a threshold probability, then this can suggest that the first audio signal is noise-dominant and includes little or no speech content.

Next, method 900 advances to block 906, which includes using the identified first noise content to determine an estimated noise content captured by the plurality of microphones. In some embodiments, the step of using the identified first noise content to determine an estimated noise content captured by the plurality of microphones involves the network device updating a noise content PSD matrix for use in the MCWF algorithm described above with respect to Equations 30-34.

In some embodiments, the steps of identifying the first noise content in the first audio signal at block 904 and using the identified first noise content to determine an estimated noise content captured by the plurality of microphones at block 906 are carried out based on the probability of speech being present in the first audio signal being below a threshold probability. As noted above, the speech presence probability algorithm indicating that the probability of speech being present in the first audio signal is below the threshold probability suggests that the first audio signal is noise-dominant and includes little or no speech content. Such a noise-dominant signal is more likely than less noise-dominant signals to provide an accurate estimate of noise present in other signals captured by the microphones, such as the second audio signal. Accordingly, in some embodiments, the step of using the identified first noise content to determine an estimated noise content captured by the plurality of microphones is carried out responsive to determining that the probability of speech being present in the first audio signal is below the threshold probability. The threshold probability can take on various values and, in some embodiments, can be adjusted to tune the noise filtering methods described herein. In some embodiments, the threshold probability is set as low as 1%. In other embodiments, the threshold probability is set to a higher value, such as between 1% and 10%.

Next, method 900 advances to block 908, which includes using the estimated noise content to suppress the first noise content in the first audio signal and the second noise content in the second audio signal. In some embodiments, the step of using the estimated noise content to suppress the first noise content in the first audio signal and the second noise content in the second audio signal involves the network device using the updated noise content PSD matrix to apply a linear filter to each audio signal captured by the plurality of microphones, as described above with respect to Equations 35-40.

Next, method 900 advances to block 910, which includes combining the suppressed first audio signal and the suppressed second audio signal into a third audio signal. In some embodiments, the step of combining the suppressed first audio signal and the suppressed second audio signal into a third audio signal involves the network device combining suppressed audio signals from all microphones of the plurality of microphones into the third audio signal.

Next, method 900 advances to block 912, which includes determining that the third audio signal includes a voice input comprising a wake word. In some embodiments, the step of determining that the third audio signal includes a voice input comprising a wake word involves the network device performing one or more voice processing algorithms on the third audio signal to determine whether any portion of the third audio signal includes a wake word. In operation, the step of determining that the third audio signal includes a voice input comprising a wake word can be performed according to any of the wake word detection methods disclosed and described herein and/or any wake word detection method now known or later developed.

Finally, method 900 advances to block 914, which includes, in response to the determination that the third audio signal includes speech content comprising a wake word, transmitting at least a portion of the voice input to a remote computing device for voice processing to identify a voice utterance different from the wake word. As noted above, the voice input may include the wake word as well as a voice utterance that follows the wake word. The voice utterance may include a spoken command as well as one or more spoken keywords. Accordingly, in some embodiments, the step of transmitting at least a portion of the voice input to a remote computing device for voice processing to identify a voice utterance different from the wake word comprises transmitting a portion of the voice input after the wake word, which may include the spoken command and/or the spoken keywords, to a separate computing system for voice analysis.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. For example, in some embodiments other techniques for determining the probability of speech absence may be employed. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a computer memory, DVD, CD, Blu-ray, and so on, storing the software and/or firmware.

What is claimed is:

1. A network device comprising:
   a plurality of microphones comprising a first microphone and a second microphone;
   one or more processors; and
   tangible, non-transitory, computer-readable media storing instructions executable by the one or more processors to cause the network device to perform operations comprising:
   capturing (i) a first audio signal via the first microphone and (ii) a second audio signal via the second microphone, wherein the first audio signal comprises first noise content from a noise source and the second audio signal comprises second noise content from the noise source;
   identifying the first noise content in the first audio signal;
   using the identified first noise content to determine an estimated noise content captured by the plurality of microphones;
   using the estimated noise content to suppress the first noise content in the first audio signal and the second noise content in the second audio signal;
   combining the suppressed first audio signal and the suppressed second audio signal into a third audio signal;
   determining that the third audio signal includes a voice input comprising a wake word; and
   in response to the determination, transmitting at least a portion of the voice input to a remote computing device for voice processing to identify a voice utterance different from the wake word.

2. The network device of claim 1, the operations further comprising:
   determining a probability that the first audio signal comprises speech content,
   wherein the steps of (i) identifying the first noise content in the first audio signal and (ii) using the identified first noise content to determine an estimated noise content captured by the plurality of microphones are carried out based on the determined probability being below a threshold probability.

3. The network device of claim 1 further comprising a housing that at least partially encloses components of the network device within the housing, wherein the first and second microphones are disposed along the housing and separated from one another by a distance that is greater than about five centimeters.

4. The network device of claim 1, the operations further comprising:
   capturing a fourth audio signal via a third microphone of the plurality of microphones, wherein the fourth audio signal comprises third noise content from the noise source;
   identifying the third noise content in the fourth audio signal; and
   using the identified third noise content to update the estimated noise content captured by the plurality of microphones.

5. The network device of claim 4, wherein the network device captures the fourth audio signal concurrently with capturing the first and second audio signals.

6. The network device of claim 4, further comprising a housing that at least partially encloses components of the network device within the housing, wherein the first, second, and third microphones are disposed along the housing and separated from one another by a distance that is greater than about five centimeters.

7. The network device of claim 1, wherein transmitting at least a portion of the voice input to a remote computing device for voice processing to identify a voice utterance different from the wake word comprises transmitting a portion of the voice input after the wake word to a separate computing system for voice analysis.

8. Tangible, non-transitory, computer-readable media storing instructions executable by one or more processors to cause a network device to perform operations comprising:
   capturing, via a plurality of microphones of a network device, (i) a first audio signal via a first microphone of the plurality of microphones and (ii) a second audio signal via a second microphone of the plurality of microphones, wherein the first audio signal comprises first noise content from a noise source and the second audio signal comprises second noise content from the noise source;
   identifying the first noise content in the first audio signal;

using the identified first noise content to determine an estimated noise content captured by the plurality of microphones;
using the estimated noise content to suppress the first noise content in the first audio signal and the second noise content in the second audio signal;
combining the suppressed first audio signal and the suppressed second audio signal into a third audio signal;
determining that the third audio signal includes a voice input comprising a wake word; and
in response to the determination, transmitting at least a portion of the voice input to a remote computing device for voice processing to identify a voice utterance different from the wake word.

9. The tangible, non-transitory, computer-readable media of claim 8, the operations further comprising:
determining a probability that the first audio signal comprises speech content,
wherein the steps of (i) identifying the first noise content in the first audio signal and (ii) using the identified first noise content to determine an estimated noise content captured by the plurality of microphones are carried out based on the determined probability being below a threshold probability.

10. The tangible, non-transitory, computer-readable media of claim 8, wherein the network device comprises a housing that at least partially encloses components of the network device within the housing, and wherein the first and second microphones are disposed along the housing and separated from one another by a distance that is greater than about five centimeters.

11. The tangible, non-transitory, computer-readable media of claim 8, the operations further comprising:
capturing a fourth audio signal via a third microphone of the plurality of microphones, wherein the fourth audio signal comprises third noise content from the noise source;
identifying the third noise content in the fourth audio signal; and
using the identified third noise content to update the estimated noise content captured by the plurality of microphones.

12. The tangible, non-transitory, computer-readable media of claim 11, wherein the fourth audio signal is captured concurrently with the first and second audio signals.

13. The tangible, non-transitory, computer-readable media of claim 11, wherein the network device comprises a housing that at least partially encloses components of the network device within the housing, wherein the first, second, and third microphones are disposed along the housing and separated from one another by a distance that is greater than about five centimeters.

14. The tangible, non-transitory, computer-readable media of claim 8, wherein transmitting at least a portion of the voice input to a remote computing device for voice processing to identify a voice utterance different from the wake word comprises transmitting a portion of the voice input after the wake word to a separate computing system for voice analysis.

15. A method comprising:
capturing, via a plurality of microphones of a network device, (i) a first audio signal via a first microphone of the plurality of microphones and (ii) a second audio signal via a second microphone of the plurality of microphones, wherein the first audio signal comprises first noise content from a noise source and the second audio signal comprises second noise content from the noise source;
identifying the first noise content in the first audio signal;
using the identified first noise content to determine an estimated noise content captured by the plurality of microphones;
using the estimated noise content to suppress the first noise content in the first audio signal and the second noise content in the second audio signal;
combining the suppressed first audio signal and the suppressed second audio signal into a third audio signal;
determining that the third audio signal includes a voice input comprising a wake word; and
in response to the determination, transmitting at least a portion of the voice input to a remote computing device for voice processing to identify a voice utterance different from the wake word.

16. The method of claim 15, further comprising:
determining a probability that the first audio signal comprises speech content,
wherein the steps of (i) identifying the first noise content in the first audio signal and (ii) using the identified first noise content to determine an estimated noise content captured by the plurality of microphones are carried out based on the determined probability being below a threshold probability.

17. The method of claim 15, wherein the network device comprises a housing that at least partially encloses components of the network device within the housing, and wherein the first and second microphones are disposed along the housing and separated from one another by a distance that is greater than about five centimeters.

18. The method of claim 15, further comprising:
capturing a fourth audio signal via a third microphone of the plurality of microphones, wherein the fourth audio signal comprises third noise content from the noise source;
identifying the third noise content in the fourth audio signal; and
using the identified third noise content to update the estimated noise content captured by the plurality of microphones.

19. The method of claim 18, wherein the fourth audio signal is captured concurrently with the first and second audio signals.

20. The method of claim 18, wherein the network device comprises a housing that at least partially encloses components of the network device within the housing, wherein the first, second, and third microphones are disposed along the housing and separated from one another by a distance that is greater than about five centimeters.

* * * * *